US006184885B1

(12) United States Patent
DeStefano

(10) Patent No.: US 6,184,885 B1
(45) Date of Patent: Feb. 6, 2001

(54) COMPUTER SYSTEM AND METHOD FOR CONTROLLING THE SAME UTILIZING LOGICALLY-TYPED CONCEPT HIGHLIGHTING

(75) Inventor: George Francis DeStefano, Rochester, MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/039,916

(22) Filed: Mar. 16, 1998

(51) Int. Cl.[7] .................................................. G06F 3/14
(52) U.S. Cl. ........................... 345/356; 345/346; 706/55; 706/60
(58) Field of Search ...................... 345/356, 346, 345/348, 357, 353; 706/55, 60, 31, 26

(56) References Cited

U.S. PATENT DOCUMENTS

| | | | |
|---|---|---|---|
| 4,663,616 | 5/1987 | Himelstein | 340/724 |
| 4,860,218 | 8/1989 | Sleator | 364/518 |
| 4,868,765 | 9/1989 | Diefendorff | 364/521 |
| 4,964,077 | 10/1990 | Eisen et al. | 364/900 |
| 5,122,972 | 6/1992 | Richards et al. | 395/157 |
| 5,186,629 | 2/1993 | Rohen | 434/114 |
| 5,301,301 | 4/1994 | Kodosky et al. | 395/500 |
| 5,335,320 | 8/1994 | Iwata et al. | 395/155 |
| 5,361,361 | 11/1994 | Hickman et al. | 395/700 |
| 5,363,482 | * 11/1994 | Victor et al. | 345/346 |
| 5,416,903 | 5/1995 | Malcolm | 395/155 |
| 5,461,399 | 10/1995 | Cragun | 345/145 |
| 5,483,632 | 1/1996 | Kuwamoto et al. | 395/156 |
| 5,506,937 | * 4/1996 | Ford et al. | 706/11 |
| 5,528,744 | 6/1996 | Vaughton | 395/157 |
| 5,610,828 | 3/1997 | Kodosky et al. | 364/489 |
| 5,615,326 | 3/1997 | Orton et al. | 395/356 |
| 5,617,114 | 4/1997 | Bier et al. | 345/113 |
| 5,621,874 | * 4/1997 | Lucas et al. | 707/500 |
| 5,644,740 | * 7/1997 | Kiuchi | 345/357 |
| 5,694,561 | 12/1997 | Malamud et al. | 395/346 |
| 5,751,283 | 5/1998 | Smith | 345/342 |
| 5,760,772 | 6/1998 | Austin | 345/342 |
| 5,771,042 | 6/1998 | Santos-Gomez | 345/342 |
| 5,796,402 | 8/1998 | Ellison-Taylor | 345/342 |
| 5,802,514 | 9/1998 | Huber | 707/4 |

(List continued on next page.)

OTHER PUBLICATIONS

Michelle Shaw, *Microsoft® Office 6–in–1*, Que Corporation, (1994), pp. 10–11, 14–15, 40 and 42–43.
*Screen Shot of Microsoft Works Software Application,* (no date).
*Screen Shots of Lotus Notes Software Application,* (no date).
"Visualizing the Information Space of Hypermedia Systems", *Graphics Visualization & Usability Center,* (no date).
Elder et al., "Architecture for Platform and Presentation Independent User Interface for Applications", *IBM® Technical Disclosure Bulletin,* vol. 38, No. 1, pp. 297–302, (Jan. 1995).
Brittan, David, "MIT Reporter", *Technology Review,* pp. 12–14, (Feb. 1997).

*Primary Examiner*—Raymond J. Bayerl
*Assistant Examiner*—Cuong T. Thai
(74) *Attorney, Agent, or Firm*—Wood, Herron, & Evans, L.L.P.; Steven W. Roth

(57) ABSTRACT

A computer system and method of controlling the same utilize logically-typed concept highlighting to link together in a user's mind the relationships between various concepts within a body of knowledge. Information from a body of knowledge is maintained in one or more information elements, at least a portion of which are associated with one or more named concepts. Links are defined between two or more named concepts, so that information elements associated with named concepts linked via a link may be visually represented to a user in such a manner that the link between such named concepts is apparent to the user. The links are selectively enabled in response to a predetermined criteria so that different links may be enabled or disabled under appropriate circumstances.

26 Claims, 11 Drawing Sheets

U.S. PATENT DOCUMENTS

| | | | |
|---|---|---|---|
| 5,808,610 | 9/1998 | Benson et al. | 345/342 |
| 5,812,804 | 9/1998 | Bates et al. | 395/342 |
| 5,815,151 | 9/1998 | Argiolas | 345/342 |
| 5,819,055 | 10/1998 | MacLean et al. | 395/342 |
| 5,835,088 | 11/1998 | Jaaskelainen, Jr. | 345/343 |
| 5,856,826 | 1/1999 | Craycroft | 345/346 |
| 5,874,962 | 1/1999 | de Judicibus et al. | 345/342 |
| 5,874,964 * | 2/1999 | Gille | 345/356 |
| 5,880,733 | 3/1999 | Horvitz et al. | 345/355 |
| 5,912,668 | 6/1999 | Sciammarella et al. | 345/348 |
| 5,920,314 | 7/1999 | Maesano et al. | 345/340 |
| 5,937,400 * | 8/1999 | Au | 706/55 |

* cited by examiner

| Link Pointer Highlighting Controls | | | | | | |
|---|---|---|---|---|---|---|
| ConceptID | Crossover Sensitive | Highlight Enabled | | Link Type | Highlight Enabled | LevelID | Restriction Enforced |
| energy | ◎ | ◎ | | synonym | ◎ | null | ◎ |
| newton_energy | ◎ | ◎ | | antonym | ◎ | gen | ◎ |
| newton_work | ◎ | ◎ | | member | ◎ | phystd | ◎ |

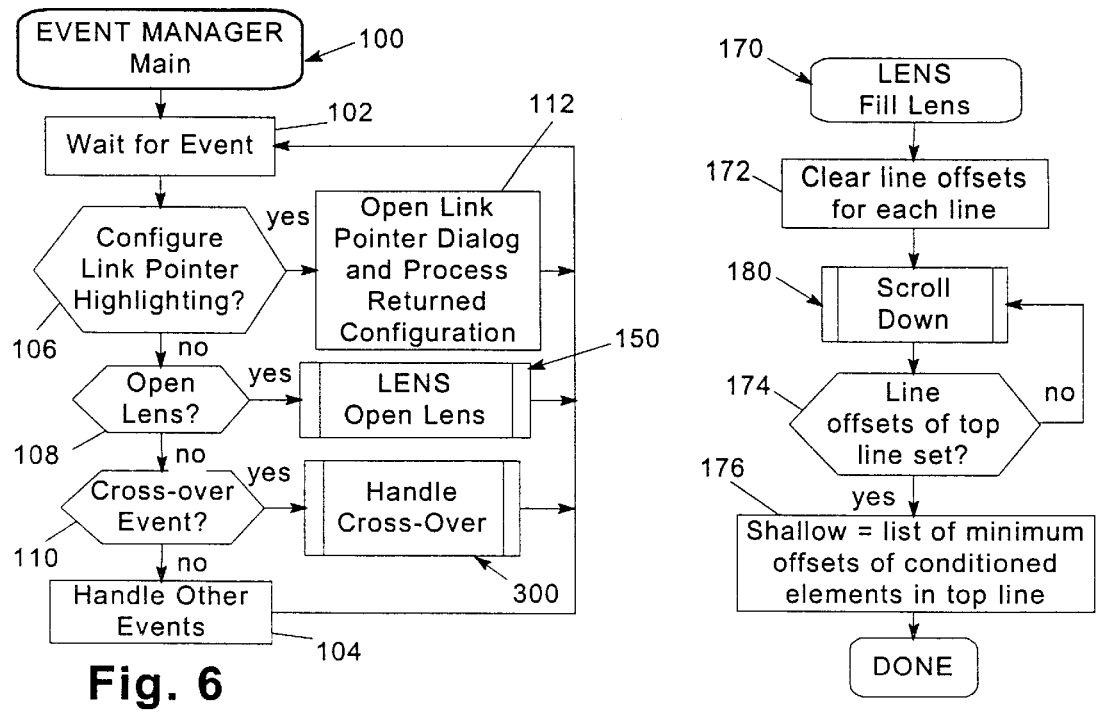
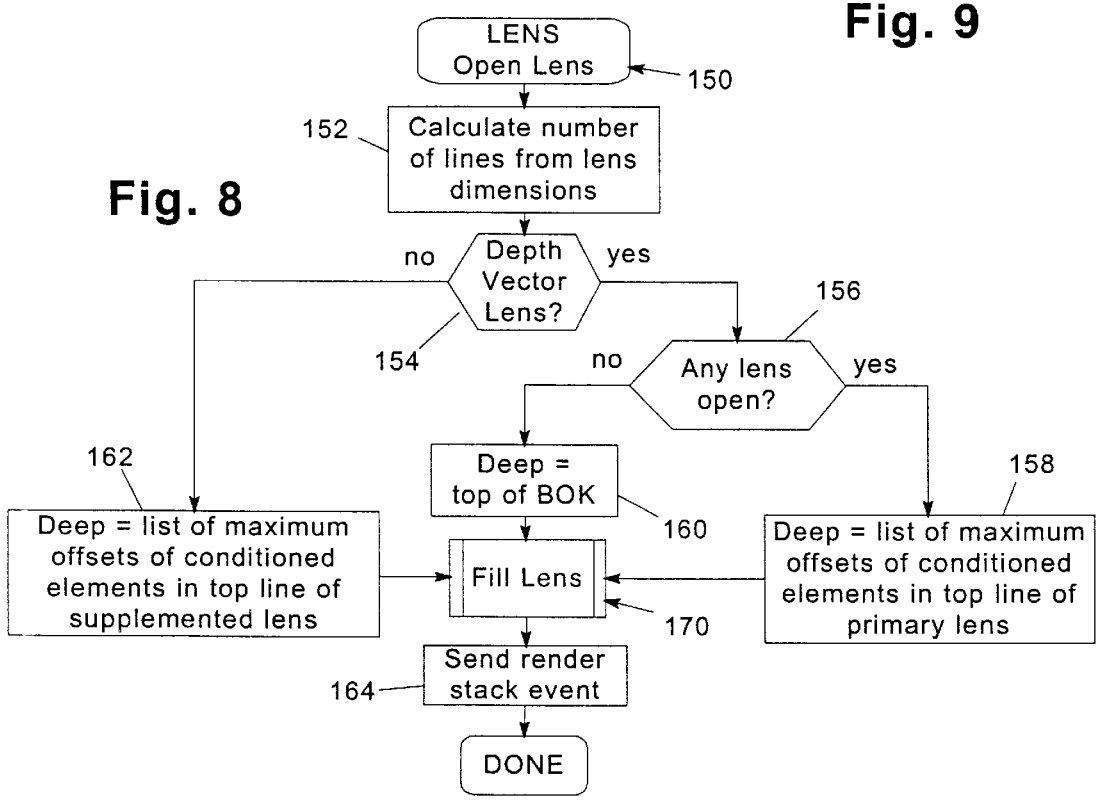
Fig. 6
Fig. 9
Fig. 8

COMPUTER SYSTEM AND METHOD FOR CONTROLLING THE SAME UTILIZING LOGICALLY-TYPED CONCEPT HIGHLIGHTING

CROSS-REFERENCE TO RELATED APPLICATIONS

This application is related to the co-pending application, which was filed on even date herewith by George Francis DeStefano, U.S. Ser. No. 09/039,915, now pending entitled "COMPUTER SYSTEM AND METHOD FOR CONTROLLING THE SAME UTILIZING AN ABSTRACTION STACK WITH A SEQUENCE OF PREDETERMINED DISPLAY FORMATS" (RO997-089). This application is also related to the following co-pending applications which were filed on Feb. 9, 1998 by George Francis DeStefano: U.S. Ser. No. 09/020,668, now pending entitled "COMPUTER SYSTEM AND METHOD FOR AUTHORING, ABSTRACTING AND ACCESSING A BODY OF KNOWLEDGE" (RO997-003); U.S. Ser. No. 09/020,534, now pending entitled "COMPUTER SYSTEM, METHOD AND USER INTERFACE COMPONENTS FOR ABSTRACTING AND ACCESSING A BODY OF KNOWLEDGE" (RO997-004); U.S. Ser. No. 09/020,680, now pending entitled "COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR" (RO997-090); and U.S. Ser. No. 09/020,679 now pending entitled "COMPUTER SYSTEM AND METHOD FOR ABSTRACTING AND ACCESSING A CHRONOLOGICALLY-ARRANGED COLLECTION OF INFORMATION" (RO997-092). Moreover, this application is related to the following co-pending applications which were filed on Dec. 15, 1997 by George Francis DeStefano: U.S. Ser. No. 08/990,370 entitled "COMPUTER SYSTEM AND METHOD OF MANIPULATING A WINDOW ON A COMPUTER DISPLAY THROUGH COLLISION WITH A POINTER" (RO997-005); and U.S. Ser. No. 08/990,304 entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER" (RO997-041). Each of these applications is hereby incorporated by reference herein.

FIELD OF THE INVENTION

The invention is generally related to computer systems and graphical user interface environments therefor. More particularly, the invention is related to display and user access to information in a computer system or the like.

BACKGROUND OF THE INVENTION

Much of the combined knowledge base of the world has and continues to be recorded in written form (e.g., in books), so that others are able to more conveniently access and use such information. With the advent of computer technology, more and more information is now stored in an electronic form and accessed via a computer, rather than via the written page. Nonetheless, regardless of the media used to store information, the information has and continues to be regarded as being essentially one-dimensional—that is, a series of ideas strung together in a sequence of words or pages. Book pages and computer displays are each two-dimensional in nature, and may even provide two dimensional representations of three-dimensional objects. However, the basic structure of a collection of information presented in either case is still for the most part one-dimensional insofar as a person processes the information in a generally linear fashion.

A one-dimensional representation of information may be adequate for some when the amount of information is not that great. However, a person may have difficulty fully comprehending a collection of information about a particular topic when the information is located in several sources and/or when the information is associated with several levels of abstraction.

A level of abstraction typically relates to a particular manner of looking at a given collection of information, also referred to as a body of knowledge. Among other criteria, different levels of abstraction may relate to different comprehension levels, e.g., a basic or summary level vs. an advanced level, or different points of view or ways of looking at or stratifying the information.

When accessing information in a body of knowledge (e.g., for performing a particular task relating to such information), a person may be required to manage and understand a number of levels of abstraction at the same time. However, since books and computers typically require a person to access information from one source, and/or from one level of abstraction, at a time, the person may be forced to plod through information in a linear fashion and without the ability to visualize the relationship of the information in the broader scope of the body of knowledge.

Furthermore, in the instances where a person is able to access information from more than one source or level of abstraction, the information is often provided in disjointed views, offering no opportunity for a person to visualize the interaction of information from different levels and/or sources. More importantly, the relationship between the information displayed in the disjointed views, as well as the relationship of the information within the broader scope of the body of knowledge, is often not readily discernable by a user. As a result, it can become difficult for a user to manage and comprehend information in a coherent manner.

One particular area in which conventional manners of accessing information are often lacking is in linking together for a reader various related concepts in a body of knowledge. An author, for example, may indicate a relationship between concepts by discussing the concepts in a predetermined order, or by using cross-references that refer a user to another area of a body of knowledge for a related concept (e.g., "see chapter 5 for more detail"). Given the conventional one-dimensional model for presenting a collection of information, however, such linkages are static and often do not enable both the linked concepts and the manner in which the concepts are linked to be viewed simultaneously.

Moreover, any given pair of concepts need not be linked together in the same fashion in every circumstance. At different levels of abstraction, or whenever a collection of information is being accessed for different purposes, a pair of concepts may or may not even be linked together, or may be linked together based upon different criteria. As one example, at a general, high level of abstraction, the concepts "quick" and "fast" may be considered synonyms, as both may be considered to be characteristics of rapid movement. However, at a more specific, detailed level of abstraction in a particular discipline, "quick" and "fast" may no longer be considered to be synonyms, and may be considered mutually exclusive. For example, while both a high performance jet fighter and a bumblebee may be considered to be "fast", the jet fighter may not be considered to be "quick" like a bumblebee when starting from a dead standstill.

Consequently, a significant need continues to exist for an improved manner of linking together for a user related concepts from a body of knowledge, specifically to facilitate user understanding and comprehension.

SUMMARY OF THE INVENTION

The invention addresses these and other problems associated with the prior art by providing a computer system and method of controlling the same that utilize logically-typed concept highlighting to link together in a user's mind the relationships between various concepts within a body of knowledge. Information from a body of knowledge is maintained in one or more information elements, at least a portion of which are associated with one or more named concepts that may be related to one another in any number of logically-relevant ways (e.g., being similar to or different from one another, being members of a common set or group, etc.). Links are defined between two or more of such named concepts so that information elements associated with named concepts linked together via a link may be visually represented to a user in such a manner that the logical relationship between such named concepts is apparent to the user.

Links are typically selectively enabled in response to a predetermined criteria so that different links may be enabled or disabled under appropriate circumstances. For example, a link may be selectively enabled in response to the sensitivity of one of the named concepts for the information elements to being crossed over by a pointer, or in response to a specified highlight enablement status of one of the referenced concepts. A link may also be enabled based upon the highlight enablement status of a link type associated with the link, or of a particular level of abstraction associated with the link. It should be appreciated that the aforementioned criteria for enabling a link are not exclusive, and that other criteria will be apparent to one of ordinary skill in the art.

Through the use of logically-typed links, different types and/or combinations of specific links between named concepts may be presented to a user in different circumstances, thereby providing alternate presentations of information from a body of knowledge to the user. One resultant advantage is that in certain embodiments a user may be permitted to customize which and/or how links between named concepts are presented to the user. Moreover, in other embodiments, an author of a specific body of knowledge may have the capability to select which and/or how links between named concepts are presented to different types of users to optimize the learning process for as many users as possible. Consequently, user comprehension of a body of knowledge is often enhanced through the use of such logically-typed links.

Therefore, consistent with one aspect of the invention a method of presenting information from a body of knowledge to a user on a computer display may be provided. The method includes displaying first and second display representations on a computer display, the first and second display representations respectively including information from first and second information elements, with the first and second information elements respectively associated with first and second named concepts linked to one another via a concept link, and with the concept link being selectively enabled based upon a predetermined criteria; and selectively highlighting the second display representation in response to user selection of the first display representation if the predetermined criteria for the concept link is met.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described embodiments of the invention.

BRIEF DESCRIPTION OF THE DRAWING

FIG. 6 is a flowchart illustrating the program flow of a main routine consistent with the invention.

FIG. 8 is a flowchart illustrating the program flow of the open lens routine of FIG. 6.

FIG. 9 is a flowchart illustrating the program flow of the fill lens routine of FIG. 8.

DETAILED DESCRIPTION

Hardware Environment

Figure 1:
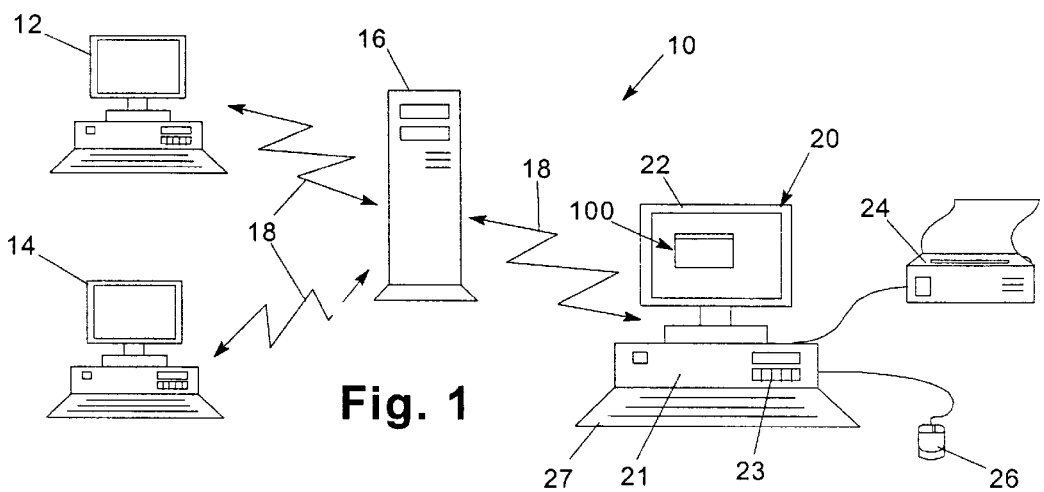
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22; storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

Computer display 22 may include any known manner of visually presenting information to a user. For example, computer display 22 may be a video monitor, e.g., a cathode-ray tube (CRT), a liquid crystal display (LCD), or a projection display, among others. In addition, other types of computer displays, including two dimensional displays that simulate three dimensions (e.g., virtual reality headsets), as well as three dimensional displays such as holographic tanks and the like, may also be used.

User input may also be received from other known user input devices. For example, control of a pointer on a display may be handled by a trackball, a joystick, a light pen, a touch sensitive pad or display, a digitizing tablet, and a keyboard, among others. In addition, many of such devices include one or more user controls such as buttons, thumb wheels, sliders and the like. Moreover, voice and/or image recognition may be used to permit a user to provide voice commands and/or gestures to provide user input to a computer system. Other user interface devices may also be used in the alternative.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Environment

Figure 2:
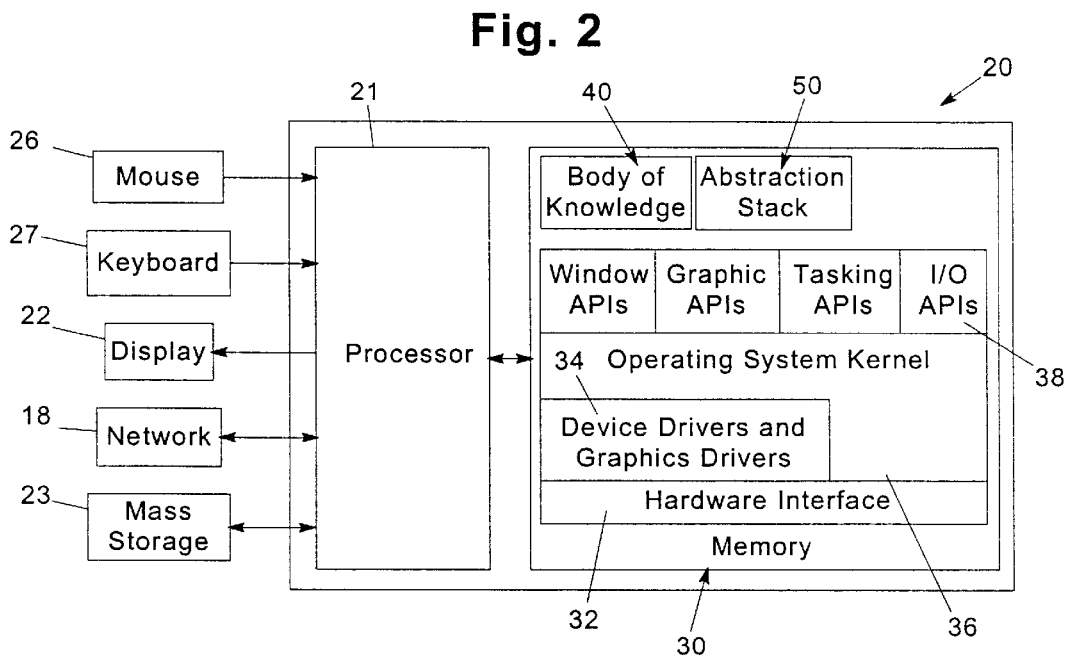
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 30 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

A number of system computer programs are stored in memory 30, including hardware interface program code 32, device and graphics drivers 34, operating system kernel 36, and various application programming interfaces (APIs) 38, e.g., Window APIs, Graphic APIs, Tasking APIs and Input/Output APIs, among others. It should be appreciated that the configuration and operation of each of these system programs typically depends upon the particular computer hardware used, and is in general well understood in the art. For example, any of a number of operating systems may be used, e.g., OS/400 for the AS/400 midrange computer, Windows 95 or Windows NT for a PC system, MacOS for the Macintosh computer, or any of the number of variations of UNIX, among others.

Any number of computer software applications may execute on computer system 10 by utilizing the system program code provided therein. Moreover, memory 30 may also store data utilized by various applications or system program code. For example, FIG. 2 illustrates a body of knowledge 40 and an abstraction stack 50, each of which are discussed in greater detail below.

It should be appreciated that the system program code represented at 32–38, body of knowledge 40, and abstraction stack 50 may be stored on network 18 or mass storage 23 prior to start-up. In addition, each may have various components that are resident at different times in any of memory 30, mass storage 23, network 18, or within registers and/or caches in processor 21 (e.g., during execution thereof).

It should also be appreciated that other software environments may be utilized in the alternative.

Selectively-Enabled Link Pointer Highlighting

As discussed above, various embodiments of the invention selectively enable link pointer highlighting to introduce context-sensitive highlighting to an abstraction stack consistent with the invention. Prior to a detailed discussion of this feature, however, a brief introduction to basic abstraction stack concepts is provided.

Abstraction Stack Concepts and Example Body of Knowledge

A number of the hereinafter described embodiments utilize an abstraction stack to represent information from a body of knowledge (BOK) stratified into a plurality of levels of abstraction. The specific details regarding the construction, implementation, and use of an abstraction stack are generally disclosed in the herein incorporated applications entitled "COMPUTER SYSTEM AND METHOD FOR AUTHORING, ABSTRACTING AND ACCESSING A BODY OF KNOWLEDGE"; "COMPUTER SYSTEM, METHOD AND USER INTERFACE COMPONENTS FOR ABSTRACTING AND ACCESSING A BODY OF KNOWLEDGE"; and "COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR". The reader is therefore directed to these applications for a more detailed understanding of the specific components discussed herein.

Figure 3:
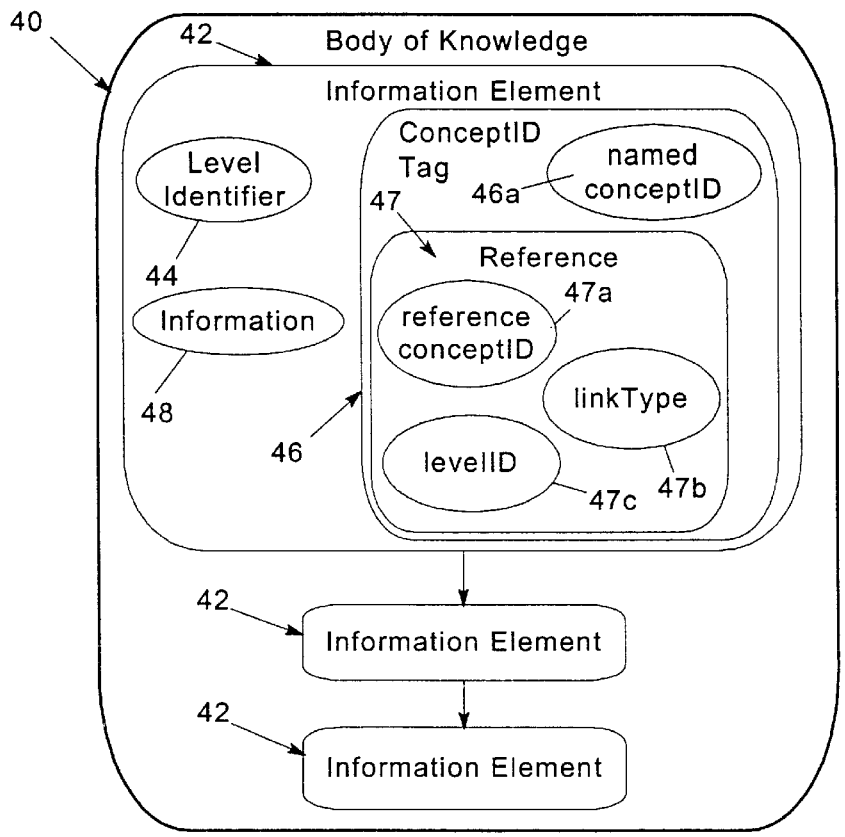
FIG. 3 is a block diagram of the software components in the body of knowledge of FIG. 2.

For example, FIG. 3 illustrates one manner of maintaining a body of knowledge 40 that utilizes an ordered list of information elements 42. An information element typically represents a segment of data that conveys information related to one or more levels of abstraction in a body of knowledge.

Each information element includes a level identifier 44, one or more concept identifier tags 46 and information 48. Level identifier 44 generally represents an author's designation of which if any levels of abstraction are related to the information in the information element, and thus, whether the information element is suitable for presentation in conjunction with the presentation of a particular level of abstraction. The level identifier can have a number of possible values, including a null value, a single level value, a list of level values, a range of level values, a list of ranges of level values, an upper level boundary, a lower level boundary, or any combination thereof.

A level of abstraction typically represents a particular manner of looking at a given body of knowledge, and may be based on numerous criteria. Generally, any abstraction stack may often be considered as addressing audiences with multiple levels of ability and interest. The audiences in some instances are made up of separate individuals. In other instances, a single individual's ability and interest can vary over time so that a single individual represents multiple audiences. As a result, the manner in which levels of abstraction are established for a body of knowledge can determine how different presentations can be tailored to specific audiences.

Each concept identifier tag 46 generally represents an author's identification of an information element in terms of one or more named concepts. Named concepts may be associated with one another based upon a number of different linkages. Each concept identifier tag 46 may therefore include a named concept identifier 46a and one or more references 47, each of which includes one or more of a reference concept identifier 47a, a link type 47b and a level identifier 47c.

Named concept identifier 46a identifies a named concept to be associated with the information element. Identifier 46a is also used as the "source" for a reference to another named concept, also referred to herein as a referenced concept, that is the "target" of the reference.

For a given reference 47, reference concept identifier 47a identifies the target named concept referenced by named concept identifier 46a for the information element. Optionally, the same named concept as specified by the named concept identifier may be stored as a reference concept identifier 47a so that a link to all information elements associated with the named concept will be highlighted. In the alternative, it may be assumed that a named concept identified in identifier 46a is always to be used as a target for a reference, such that the explicit reference need not be maintained in a reference 47.

Link type 47b optionally identifies a type of linkage between the named concepts specified in the tag and the reference concept identifier in the reference. For example, one type of linkage may be a "synonym" linkage, indicating that two named concepts are associated with basically alternative expressions of a common concept. This type of linkage may be used as a default linkage type, and is similar to the named concept linkage described in the aforementioned incorporated applications.

Another type of linkage may be an "antonym" linkage, which may be used to indicate a contrast or comparison between information elements respectively associated with two named concepts linked in this manner. Yet another type of linkage may be "member" linkage, where named concepts are considered to be members of a set based upon a particular criteria that defines the set. For example, named concepts for the states of Minnesota, Michigan, Missouri, Montana, Maryland, Mississippi, Massachusetts, and Maine may be linked together as a set of named concepts for states starting with the letter "M". Moreover, other linkages may be defined, e.g., a linkage binding concepts to specific tasks, e.g., to specific problems in a study-exercise assignment.

Other possible link types may include, for example, parent-child links (child concept derived from parent concept), antecedent-consequent links (consequent concept is true if antecedent concept is true), sibling links (sibling concepts derived from same parent concept), cousin links (derived from sibling concepts), prerequisite-dependent links (dependent concept is meaningful only in the context of the prerequisite concept), biconditional connective links (consequent concept is true if and only if antecedent concept is true), codependent links (each concept is meaningful only in the context of the others), mutually exclusive links (no concept is meaningful in the context of the others), superseding-superseded links (superseding concept encompasses superseded concept, making it obsolete or unnecessary), premise-condition links (premise concept is part of an argument that implies conclusion concept), inference links (a concept is inferred from other concepts), example links (example concept is a specific instance of a general concept), counterexample links (counterexample concept is a specific instance of the antonym of a general concept), object-class links (object concept is an instantiation of a class concept), logically equivalent links (sentential formulae are logically equivalent if they yield the same truth-value across entire range of their component variables), etc. Other possible linkages will become apparent to one of ordinary skill in the art.

A level identifier 47c may be used to restrict enablement of link pointer highlighting for a given named concept based upon the level being displayed within a given lens. This optional identifier may be configured to pass all levels of abstraction as its default. It may be desirable to implement different types of concept linkages at different levels of abstraction, as some linkages may not be relevant for information elements from all levels of abstraction, and may in fact change for different levels of abstraction.

In the illustrated embodiment, logical-typing of concept linkages is maintained in the references for individual information elements. In the alternative, the reference information for a named concept may be stored separately from the information elements in the body of knowledge (e.g., with the list of named concepts 84 discussed below with reference to FIG. 4).

Information 48 generally represents the actual data in the information element that is relevant to the body of knowledge. The information may be as small as a bit (e.g., a flag), or may include an unlimited amount and variety of data, including text data, image data, multimedia data such as audio and/or video data, executable data, etc. As will also become apparent below, information 48 may also include other information elements, whereby nested information elements are supported.

Body of knowledge 40 may be created and/or maintained in a number of manners. For example, a body of knowledge may be stored in one or more tag-delimited text documents, e.g., using a modified Hypertext Markup Language (HTML) format. The general format of an information element that implements logically-typed links may be, for example:

"<infoel>lvl=[level identifier]cid=[concept identifier tag], ([reference concept identifier], [reference link type identifier], [reference level identifier])>
. . . [information]. . .
</infoel>"

As an example, one suitable format of a body of knowledge document that will be used hereinafter to describe the various features of the invention is illustrated below in Table I:

TABLE I

Example HTML Document

1  <HTML>
2  <HEAD>
3  <TITLE>Energy</TITLE>
4  </HEAD>
5  <BODY>
6  <H1>Energy</H1>
7  <P>Everyone knows energy is important, but who knows what energy is? You can define energy many ways.
8  <infoel lvl=gen cid=energy>One way is to define it as an essential ingredient of action.</infoel>
9  <infoel lvl=gen cid=newton_energy, (energy, synonym, phystd)> Students of Newtonian physics define energy as the ability to do work.</infoel>
10 <infoel lvl=phystd cid=newton_energy, newton_work>This definition of energy uses a much narrower definition of work than is found in common use.
11 <infoel lvl=phystd cid=newton_work> Work is done when an applied force moves something . . . </infoel>
12 </infoel>
13 No matter what else you have, you can't <b>do</b> anything without energy. You need energy to earn a living. You need it to play. You need energy to travel. You need it to live. You need it to breath. You need energy to dream. Where do you find energy? Everywhere.</P>
14 <P><infoel lvl=gen cid=einstein_energy, (energy, synonym, phystd)>Students of Einstein define energy as mass.</infoel>
15 You have mass. You have energy. You've seen the famous equation: <img src="emc2.gif" alt="e=mc2" align=right><br>
16 <infoel lvl=phystd cid=einstein_energy, einstein_mass> Relativistic energy is comprised of kinetic and rest energies . . . shows that mass is energy . . . </infoel>
17 "Energy equals mass times the speed of light squared." The speed of light squared is a very large quantity. You don't have to be very big to have a lot of energy. That's a nice, powerful thought, but <b>you</b> can't really use this energy for the things you want to do. Where do you find energy you can use?
18 <H2>Energy sources</H2>
19 <P><infoel lvl=gen cid=energy_sources>
20 We have many sources of energy. Ultimately, all of our energy comes from the sun and the stars. Most of the energy we enjoy comes directly from the sun to heat the earth, our oceans, the air and even our bodies. In the sun this is fusion energy, but it reaches us as electromagnetic energy . . . </infoel></P>
21 <P><infoel lvl=gen cid=fire, (heat, synonym, gen)>Fire make things hot. We generally think of fire as a hot thing, but fire is not actually a thing at all, it is a process.
22 <infoel lvl=gen cid=energy_chemical, (energy_sources, member, gen)>Fire is a common name for a chemical process called combustion. In this process atoms combine with other atoms to form molecules. The act of combining . . . molecular bond . . . releases energy . . . heat . . . </infoel></P>
23 </infoel>
24 <P><infoel lvl=gen cid=energy_solar, (energy_sources, member, gen), (heat, synonym, gen)>The sun makes things hot . . . Fusion energy originates in the sun . . . atoms . . . electrons . . . combine . . . hydrogen . . . helium . . . heat . . . vibration . . . radiation . . . photons . . . electricity . . . radiation . . . vibration . . . heat . . . </infoel></P>
25 <P><infoel lvl=gen cid=energy_geothermal, (energy_sources, member, gen), (heat, synonym, gen)> The earth's core is a source of heat. Fission energy originates deep within the earth . . . atoms . . . electrons . . . half-life . . . decay . . . split . . . uranium . . . plutonium . . . heat . . . magma . . . volcanoes . . . hot springs . . . geothermal </infoel></P>
26 <P><infoel lvl=gen cid=gravity, (energy_sources, member, gen)> Gravity makes things move. Gravity causes water to flow downhill. Electric generators in dams are driven by the mechanical energy imparted by the water pushing against paddle blades. Hydroelectric energy comes from the earth and the sun . . . Heat from the sun causes water to evaporate . . . clouds . . . rain . . . lakes . . . rivers . . . dams . . .

TABLE I-continued

Example HTML Document

```
    </infoel></P>
27  <infoel lvl=gen cid=heat, (cold, antonym, gen)> Hot things are in a high energy
    state. We use hot things as a source of energy. We make things hot to generate
    energy sources . . . </infoel>
28  <infoel lvl=gen cid=cold, (heat, antonym, gen)>Cold things are in a low energy
    state. We use cold things to absorb excess energy.</infoel>
29  </infoel>
30  </BODY>
31  </HTML>
```

While the above body of knowledge is shown in an HTML format for illustrative purposes, it should be appreciated that any number of data storage formats may be used consistent with the invention. For example, the body of knowledge may be input into the data structure illustrated in FIG. 3 as described in the various herein incorporated applications.

The example body of knowledge is directed to a reference work on the subject of energy. Three levels of abstraction are defined, a "null" level of abstraction, a "general" level of abstraction (represented by level identifier "gen") and a "physics student" level of abstraction (represented by level identifier "phystd"). Moreover, a number of named concepts are defined, including the concept identifiers "energy", "newton_energy", "newton_work", "einstein_energy", "einstein_mass", "energy_sources", "fire", "heat", "energy_chemical", "energy_solar", "energy_geothermal", "gravity", and "cold".

Synonym-type links, level restricted to the "phystd" level, are defined in lines 9 and 14 from "newton_energy" and "einstein_energy" to "energy". Other synonym-type links, level restricted to the "gen" level, are defined in lines 21, 24 and 25 from "fire", "energy_solar" and "energy_geothermal" to "heat". Antonym-type links, level restricted to the "gen" level, are defined in lines 27 and 28 between "heat" and "cold", and member-type links, level restricted to the "gen" level, are defined in lines 22, 24, 25 and 26 from "energy_chemical", "energy_solar", "energy_geothermal" and "gravity" to "energy_sources".

As discussed above, an abstraction stack is utilized to access and/or manipulate the information stored in a body of knowledge, e.g., body of knowledge 40. One suitable implementation of an abstraction stack is illustrated at 50 in FIG. 4. The abstraction stack includes two primary components, a depth manager 60 and a flow manager 80. Depth manager 60 generally maintains the data structure of the abstraction stack and handles rendering of the abstraction stack on a computer display. Flow manager 80, on the other hand, generally handles the user interaction with the data structure to modify the manner in which the body of knowledge is displayed within the abstraction stack's lenses.

Depth manager 60 generally handles the data structure of the abstraction stack as well as rendering of the abstraction stack on a computer display. The data structure of the abstraction stack includes a plurality of objects representing different abstraction stack components. These components generally include a depth vector 62, a set of lenses 64, compass handles 65, binder bands 66 and intersection points 68, each of which is discussed in greater detail in the herein incorporated applications.

Flow manager 80 generally handles the user interface with the abstraction stack data structure to modify how the body of knowledge is displayed within the abstraction stack's lenses, including handling information flow to the various lenses displayed for the abstraction stack. Flow manager 80 is coupled to depth manager 60 through a number of client/server pairs shown at 52. The client/server pairs 52 couple together lenses with filters and a working copy of the body of knowledge, and generally function to control the flow of information from the body of knowledge into a lens.

Flow manager 80 also includes a number of objects that are utilized to handle user interaction with the abstraction stack. For example, flow manager 80 utilizes one or more filter objects 82 to define the manner in which information is displayed in suspended lenses. A list of available named concepts 84 is also maintained by flow manager 80 to determine when to visually link together information that is related to a particular concept when information from different levels of abstraction is concurrently displayed.

Information regarding the named concepts may be stored in any number of suitable data structures, e.g., a named concept table that identifies each named concept and reference in a body of knowledge. For example, for the example body of knowledge of Table I, one suitable data structure is set forth below in Table II:

TABLE II

Named Concept Table

| Info. El. | Lvl | Concept ID | Reference CID | Link Type | Ref. Lvl ID | Highlight On |
|---|---|---|---|---|---|---|
| 6 | null | null | | | | |
| 7 | null | null | | | | |
| 8 | gen | energy | energy | synonym | gen | |
| 9 | gen | newton_energy | newton_energy | synonym | gen | |
| 9 | gen | newton_energy | energy | synonym | phystd | |
| 10 | phystd | newton_energy | newton_energy | synonym | phystd | |
| 10 | phystd | newton_work | newton_work | synonym | phystd | |
| 11 | phystd | newton_work | newton_work | synonym | phystd | |

TABLE II-continued

Named Concept Table

| Info. El. | Lvl | Concept ID | Reference CID | Link Type | Ref. Lvl ID | Highlight On |
|---|---|---|---|---|---|---|
| 13 | null | null | | | | |
| 14 | gen | einstein_energy | einstein_energy | synonym | gen | |
| 14 | gen | einstein_energy | energy | synonym | phystd | |
| 15 | null | null | | | | |
| 16 | phystd | einstein_energy | einstein_energy | synonym | phystd | |
| 16 | phystd | einstein_mass | einstein_mass | synonym | phystd | |
| 17 | null | null | | | | |
| 18 | null | null | | | | |
| 19 | gen | energy_sources | energy_sources | synonym | gen | |
| 21 | gen | fire | fire | synonym | gen | |
| 21 | gen | fire | heat | synonym | gen | |
| 22 | gen | energy_chemical | energy_chemical | synonym | gen | |
| 22 | gen | energy_chemical | energy_sources | member | gen | |
| 24 | gen | energy_solar | energy_solar | synonym | gen | |
| 24 | gen | energy_solar | energy_sources | member | gen | |
| 24 | gen | energy_solar | heat | synonym | gen | |
| 25 | gen | energy_geothermal | energy_geothermal | synonym | gen | |
| 25 | gen | energy_geothermal | energy_sources | member | gen | |
| 25 | gen | energy_geothermal | heat | synonym | gen | |
| 26 | gen | gravity | gravity | synonym | gen | |
| 26 | gen | gravity | energy_sources | member | gen | |
| 27 | gen | heat | heat | synonym | gen | |
| 27 | gen | heat | cold | antonym | gen | |
| 28 | gen | cold | cold | synonym | gen | |
| 28 | gen | cold | heat | antonym | gen | |

The information element identifier for each table row corresponds to the line number of the start of the information element in the example body of knowledge of Table I, although it should be appreciated that any number of types of information element identifiers may be used in the alternative. Moreover, as may be seen from this table, each reference established in each information element may be assigned a row in the table. In addition, a reference is automatically generated, even absent a specific reference definition, for each named concept to itself, with a default link type of "synonym" and a default reference level identifier that matches the level identifier for the associated information element.

In addition, a page builder object 86 is used in flow manager 80 to control how an abstraction stack is viewed in a computer display. The page builder, which may be similar in many respects to a component of a conventional web browser, includes a number of type managers 88 that are used to handle different types of information from a body of knowledge. For example, separate type managers may be provided for handling text information, graphical information, audio information, video information, animation information, and method information, among others. To this extent, a separate working copy 54 of the body of knowledge is used by page builder 86 for each lens-filter pair during viewing so that appropriate links to different types of information (especially executable methods) may be maintained.

Figures 5, 7:
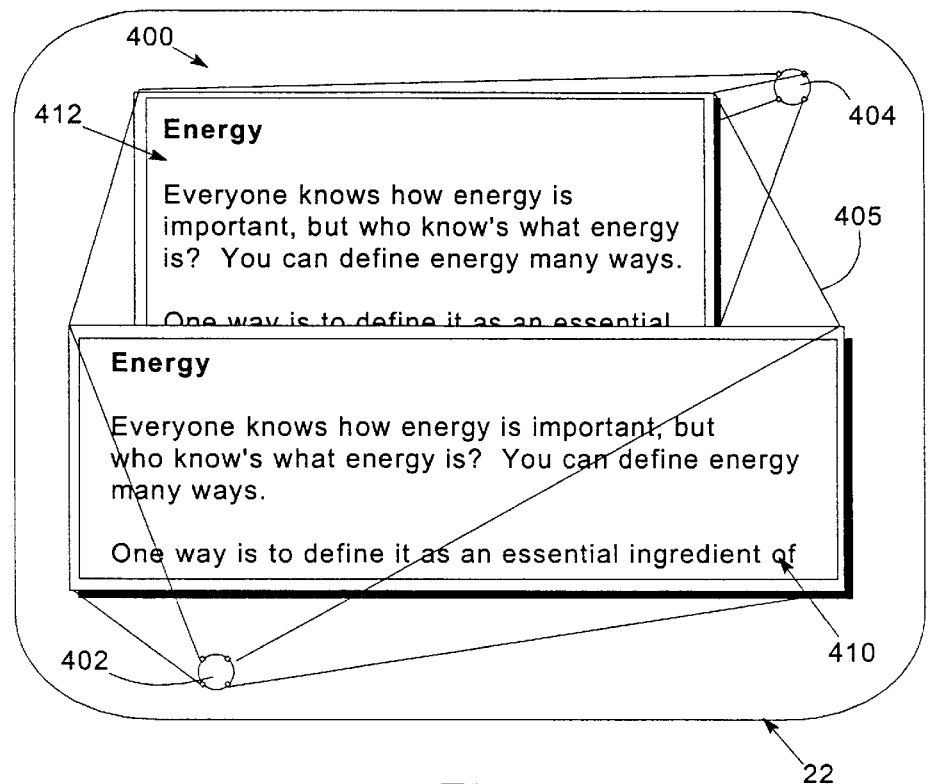
FIG. 5 is a block diagram of a computer display illustrating a representation of the abstraction stack of FIG. 4.
FIG. 7 is a block diagram of a link pointer highlighting controls dialog box utilized by the main routine of FIG. 6.

Turning briefly to FIG. 5, which provides a representation of an abstraction stack 400 consistent with the invention, an abstraction stack generally provides a visual manner of organizing multiple levels of abstraction. Each level of abstraction in a body of knowledge is typically represented in an abstraction stack by a focal plane organized along a common depth vector, or abstraction axis, extending generally perpendicular thereto. The focal planes are organized along the depth vector based upon the manner of categorizing the levels of abstraction. For example, if levels of abstraction relate to different levels of detail, the focal planes may be organized sequentially based upon the relative levels of detail for their associated levels of abstraction.

An abstraction stack functions to display information from one or more focal planes in such a manner that the different focal planes are organized in a three-dimensional workspace such that the relative arrangement of the focal planes is readily apparent therefrom. Focal planes are generally handled as two-dimensional virtual constructs, with the depth vector upon which focal planes are organized representing the third dimension of the stack. As a result, display of an abstraction stack on a two-dimensional display such as a video monitor often requires three-dimensional modeling techniques to be utilized to provide a three-dimensional rendering of an abstraction stack. It should be appreciated that a depth vector is principally an organizational construct, and may or may not be displayed on a computer display.

One type of object in an abstraction stack is a lens, e.g., lenses 410 and 412, which typically serves as a point of attachment and focus point along the abstraction stack for stack manipulation and content. A lens is typically used to display the information from one or more levels of abstraction. In addition, a lens is typically represented in much the same manner as a GUI window, with controls such as resizing handles, minimizing handles, scroll bars, etc. used to modify the appearance and content displayed in the lens, if desired.

Another type of abstraction stack object data structure is a compass handle (e.g., handles 402 and 404), which are typically located at an end of a depth vector of an abstraction stack. A compass handle typically functions as an endpoint of the abstraction stack, and may function as a focal point for manipulation of and access to a minimized or maximized abstraction stack. In addition, a compass handle may be used as a point of attachment to other related abstraction stacks for a particular body of knowledge.

Another object in the abstraction stack data structure is a binder band, which provides one manner of visually representing the hierarchical arrangement of levels of abstraction via visually connecting other objects displayed along a depth vector of an abstraction stack. One subclass of a binder band is a shaft band (e.g., shaft band 405), which generally links together objects associated with different levels of abstraction in a body of knowledge. Another subclass of a binder band is a strata band (not shown), which generally links together objects associated with the same level of abstraction in a body of knowledge. A binder band is typically represented by one or more connecting elements that extend between two other displayed objects. For example, in one embodiment, a binder band may be represented by four lines extending between corresponding corners of two objects. Other numbers of lines, as well as other forms of connecting elements, may be used to represent a binder band in the alternative.

Other abstraction stack objects, discussed in greater detail in the herein incorporated applications, may also be provide in abstraction stack 400 consistent with the invention. The reader is therefore directed to such applications for a better understanding of the implementation and use of such objects.

Lenses, which are much like windows in common GUI environments, may be created and manipulated to modify the presentation of information from a body of knowledge. Lenses differ from windows in the manner in which they are related to one another. That is, lenses provide coordinated views of a body of knowledge at different levels of abstraction and are visually manifested in a three-dimensional representation that reflects the stratification of the body of knowledge. Lenses are typically peers, owned by the depth manager responsible for the three-dimensional space in which they appear. Windows are related in a parent-child or master-owner relationship, and are visually represented with randomly determined three-dimensional aspects that reflect no underlying organization of the information they convey within their viewing areas.

For example, lenses may be related through a coordinated scrolling relationship, whereby multiple lenses may be coordinated to display different views of essentially the same concepts in a body of knowledge, with coordinated scrolling provided to ensure that the lenses track one another as lenses are scrolled to display other concepts in a body of knowledge. To this extent, lenses in an abstraction stack are typically grouped into one or more lens sets. Each lens set typically has associated therewith a current location or position in the body of knowledge that is consistent across each lens in the lens set. Each lens, however, may also have start and end boundaries, referred to herein as shallow and deep bounds, that define at the extent of a "window" or segment of information from the body of knowledge that is displayed in a particular lens. By maintaining the current position for the lens set between the shallow and deep bounds of each lens in the lens set, the lenses are permitted to track one another during scrolling operations.

Lenses in a coordinated scrolling lens set are typically, but not necessarily, disposed along the depth vector and connected by shaft bands such as shaft bands 405. Lenses that are disposed along a depth vector may be considered as depth vector lenses, and are typically either primary or secondary lenses. Primary and secondary lenses are associated in a common lens set, with the only difference therebetween being that a primary lens is the focus of a user's interaction with the abstraction stack in navigation of the body of knowledge, while a secondary lens is typically modified automatically in response to user operations on the primary lens. A secondary lens typically displays the same concepts as a primary lens, albeit with an independent filter configuration that provides an alternate view of essentially the same information in the body of knowledge. In addition, a secondary lens may be activated to become the primary lens, whereby the prior primary lens then becomes a secondary lens.

Each lens also has associated therewith a filter that defines how the lens displays information from the body of knowledge. Specifically, a filter for a lens typically defines whether a lens passes or blocks information elements from each level of abstraction. In addition, for each level of abstraction passed by the filter, the filter defines how the information elements therefrom are transformed, if at all, when displayed in the lens.

The types of filters that may be useful in an abstraction stack typically varies depending upon the manner in which a body of knowledge is stratified into levels of abstraction, which may be referred to as an abstraction scheme. A body of knowledge may be represented by one abstraction scheme or by multiple abstraction schemes, with one or more of such schemes specifically defined by an author or developer, and/or with one or more of such schemes inherently defined, e.g., based upon standard document components or data types.

For example, for abstraction stack 400 of FIG. 5, lens 410 is configured to pass only the "gen" level of abstraction, as well as information elements not associated with a particular level of abstraction (i.e., with a "null" level identifier). Lens 412 is configured to pass both the "gen" and "phystd" levels of abstraction, including any level-unassociated information elements as well.

Various user manipulations of lenses may be performed. For example, as discussed above, it may be desirable to provide coordinated scrolling between lenses in a lens set. In addition, it may also be possible to link together information elements relating to named concepts, e.g., so that movement of a link pointer over an information element directed to a specific named concept results in the highlighting of other displayed information elements matching the named concept (discussed in greater detail below).

Lenses and/or lens groups may also be represented in minimized or maximized representations. A minor lens typically is utilized to represent a minimized lens, and is typically arbitrarily small so that its minimized representation is apparent to a user. A maximized lens is typically represented by a prime lens, with a collapsed abstraction stack typically displayed concurrently with a prime lens to maintain a visual relationship of the prime lens within the abstraction stack as a whole.

User interaction with the abstraction stack is principally handled by a pointer (not shown in FIG. 5) that is manipulated by one or more user interface devices such as a mouse, a trackball, a keyboard, a touch pad, etc. A pointer may be placed into one of several modes, and may also be used in such operations as switching focus between lenses, highlighting information for cut and paste operations, etc. Other uses of the pointer include various conventional pointer-based actions, such as resizing, moving, closing and similar window operations, selection of menu entries, and selection of buttons, among others.

Additional user interface controls and operations may be implemented in an abstraction stack consistent with the invention. For example, a lens may include various conventional GUI window controls such as a close button, a minimize button, a maximize button, a title bar, resizing handles, scroll bars, drop-down menus, toolbar buttons, etc. A user may also be permitted to select a binder band (e.g., through single or double-clicking on the binder band) to open any adjacent minor lenses thereto, as well as optionally close any other lenses in the lens set. Lenses may also be maximized (e.g., through selection of a maximize button thereon or double-clicking on the title bar thereof), resulting in the display being switched to a prime lens view where the lens substantially fills the computer display, with only a collapsed representation of the remainder of the abstraction stack displayed.

Individual lenses in an expanded abstraction stack may also be manipulated by a user as desired. For example, lenses may be selected to control which lens is designated the primary lens for receiving user input. In addition, movement and/or resizing of lenses may be performed. Movement or resizing of a lens in a lens group or set typically modifies only that lens, although group movement and resizing operations may also be supported. However, even when a lens is resized or moved, the location of the lens along the depth vector relative to other lenses is preferably maintained so that the contextual relationship therebetween is also maintained. The position along the depth vector for a lens may be varied, but preferably not in such a manner that a lens is permitted to switch relative positions with another lens on the stack.

Movement or resizing of a lens may be performed in a number of manners consistent with the invention. For example, similar to conventional GUI windows, a lens may be moved by dragging its title bar or by using arrow keys when in a predetermined mode. Resizing of a lens typically may be performed using conventional resizing handles (e.g., by dragging the boundaries of the lens).

More preferably, however, various alternate movement mechanisms may be used in addition to and/or in lieu of conventional mechanisms. One suitable manner of moving or resizing a lens is through collision of pointer with a boundary of the lens when the pointer is in a collision resizing or movement manipulation mode. With this feature, which is the subject of the aforementioned incorporated application entitled "COMPUTER SYSTEM AND METHOD OF MANIPULATING A WINDOW ON A COMPUTER DISPLAY THROUGH COLLISION WITH A POINTER", movement of a pointer along a first vector moves a boundary segment of a lens along a second vector if it is determined that the first vector intersects that boundary segment. In a movement mode, the boundary segment is moved in conjunction with all other boundary segments to effectively move the lens. In a resizing mode, other boundary segments remain fixed to effectively resize the lens. The pointer may be defined to have a single position from which the first vector extends, or in the alternative, a proximity range may be defined around the pointer, with a boundary thereof used to test for collisions with a boundary segment of a lens.

This type of pointer manipulation, which is also referred to as a "bumper-jumper" operation, typically results in the appearance of a pointer "bumping" or "pushing" a lens as the pointer collides with the lens. The mode can be selectively enabled or disabled, including a temporary enabling or disabling operation (e.g., by holding down a control key during pointer movement) that permits a user to quickly and selectively "bump" or "jump" over any given boundary as desired. In addition, collision may be selectively detected only when contacting a boundary segment from outside a lens, and/or only when contacting a boundary segment while within the boundary of a lens.

Another suitable manner of moving or resizing a lens that may be used in lieu of or in conjunction with collision manipulation is that of proximity manipulation, such as is described in detail in the aforementioned incorporated application entitled "COMPUTER SYSTEM AND METHOD OF MANIPULATING MULTIPLE GRAPHICAL USER INTERFACE COMPONENTS ON A COMPUTER DISPLAY WITH A PROXIMITY POINTER". When in a proximity manipulation mode, lenses within a predetermined proximity range disposed around a proximity pointer may be resized or moved as a group in response to user manipulation of the pointer, thereby permitting faster manipulation of multiple objects at once.

It should be appreciated that other variations disclosed in the herein incorporated applications may also be implemented consistent with the invention. In addition, other manners of manipulating the lenses will be apparent to one of ordinary skill in the art. For example, given that a body of knowledge may be represented in a tag-delimited format such as HTML, it should also be appreciated that hypertext links and the like may be embedded in the body of knowledge such that a user can navigate to predetermined locations in the same or different lenses specified in the embedded links simply by selecting those links. Links may also be associated with particular locations in the body of knowledge, so that each lens in a lens set is scrolled in a coordinated fashion to display its particular representation of that location in the body of knowledge. Other user-coordinated operations may also be performed on the abstraction stack consistent with the invention.

Abstraction Stack Implementation

The operation and usage of an abstraction stack consistent with the invention is now described. As discussed above, an event-driven system may be utilized herein to handle user interaction with an abstraction stack. As such, a main routine for event manager 37 of operating system 36 (FIG. 2) is illustrated at 100 in FIG. 6. it should be appreciated that non-event-driven implementations may be utilized in the alternative.

Routine 100 may be considered to operate in an endless loop—typically as a dedicated process running in the background of operating system 36. As is well-known in the art, routine 100 waits for events at block 102 and passes such events to appropriate handling routines. Several such events consistent with the invention are detected at blocks 106, 108 and 110. Also shown in FIG. 6 is a block 104 that handles the multitude of other types of events generated in the computer system, but which are not relevant to an understanding of the invention.

Furthermore, any of the various events described in the herein incorporated applications may also be detected and handled in the manners described therein, e.g., initialize stack events, render stack events, create lens events, scroll events, etc. In general, an abstraction stack described herein utilizes many of the same events and processes in its implementation, with the primary differences highlighted herein. Where no modifications to these other events are pointed out herein, it should be assumed that such other events may be handled in a similar manner, and as such the reader is therefore directed to the herein incorporated applications for a more detailed discussion of such other events.

One event is a configure link pointer highlighting event, which is detected by block 106 and handled in block 112 by opening a link pointer dialog box and processing the configuration settings returned from the dialog box upon its closure by a user. For example, one suitable dialog box 90 is illustrated in FIG. 7. A scrollable list of concept ID's is displayed in a left panel of the dialog box, with each concept ID having associated therewith a crossover sensitive switch 92 and a highlight enabled switch 94. Each crossover sensitive switch 92 may be toggled on or off to gate whether link pointer highlighting is enabled when the pointer passes over an information element associated with a given concept ID. Each highlight enabled switch 94, on the other hand, gates whether an information element having a given concept ID that is referenced by a concept ID tag for the crossed-over information element is to be highlighted.

A second scrollable list of link types is provided in a center panel of the dialog box to permit highlighting of each defined link type to be enabled or disabled by an associated switch 96. A third scrollable list of level identifiers is provided in a right panel of the dialog box to permit level-restricted highlighting of concept ID's to be enabled or disabled by an associated switch 98. By failing to select that a restriction for a particular level is to be enforced, any reference level identifier for a referenced concept that specifies the level is ignored in determining whether to enable highlighting. In the alternative, highlighting of each level of abstraction may be selectively enabled or disabled, rather than restricted, by using appropriate switches.

It should be appreciated that alternate dialog box designs may be utilized to control the configuration settings for logically-typed concept highlighting. Moreover, such settings may be preset by an author (e.g., to vary the configuration settings for different steps in a sequence, as described in greater detail in the aforementioned incorporated application entitled "COMPUTER SYSTEM AND METHOD FOR CONTROLLING THE SAME UTILIZING AN ABSTRACTION STACK WITH A SEQUENCE OF PREDETERMINED DISPLAY FORMATS", or otherwise may not be configurable by a user. Other manners of receiving configuration settings may also be used consistent with the invention.

Returning to FIG. 6, another event is an open lens event, which is detected by block 108 and handled by an open lens routine 150. An open lens event, which occurs generally after a stack has been initialized and after a lens has been created, refreshes the abstraction stack to display a created lens. Yet another event is a cross-over event, which is detected by block 110 and handled by a handle cross-over routine 300. A cross-over event typically occurs in response to a pointer being moved within the display extent of an information element, often limited to such movement over an information element displayed in the primary lens.

Open lens routine 150 is illustrated in greater detail in FIG. 8. An open lens is generally any lens that is not minimized (such as a minor lens), and which displays a portion of the body of knowledge. As will become more apparent below, each lens is defined to include shallow and deep bounds, representing the boundaries of the lens generally in terms of start and end locations in the body of knowledge.

A page builder 86 operates within a lens to render conditioned BOK source elements within a line cache to form an array of display-ready "cells" for display within the lens. The line cache includes a sequence of line structures, each including a lens-wide array of display ready cells and a list of conditioned element structures. Each cell may represent, for example, an image (e.g., a bitmap) of a character or a portion of an image the same size as a character. Each conditioned element structure represents a portion of the body of knowledge that has been filtered and has been processed to condition nested and executable tags, among others. Each conditioned element structure may include a conditioned element identifier, beginning and ending cell indexes, minimum and maximum cell (or BOK) offsets, and a concept identifier.

The beginning and ending cell indexes indicate the first and last line cells occupied by a conditioned element. Special values may be assigned for "before", indicating for the beginning index that the first cell for the conditioned element is on a previous line, "after", indicating for the ending index that the last cell for the conditioned element is on a subsequent line, and "not" for both indexes indicating that the conditioned element does not occupy any cells. The minimum and maximum offsets indicate the first and last cells from the conditioned element represented on the line. So, "not" for both indexes, with the minimum offset equal to zero and the maximum offset equal to nine, may represent a ten-character word that has been blocked by the filter. Similarly, a minimum offset of zero with a maximum offset of 999 may represent a 1000-character paragraph that has been blocked by the filter.

The shallow bound for a lens is defined as the minimum cell offset for the first conditioned element (e.g., with the lowest conditioned element identifier) for the top line of the lens. The deep bound for a lens is defined as the maximum cell offset for the last conditioned element (e.g., with the highest conditioned element identifier) for the bottom line of the lens. It is also desirable to respectively maintain in the shallow and deep bounds lists of the minimum and maximum offsets for all of the conditioned elements within the top and bottom lines of the lens, respectively. Two other values, minimum line offset and maximum line offset, may also be defined. The minimum line offset may be defined as the minimum cell offset for the first conditioned element on the line, and the maximum line offset may be defined as the maximum cell offset for the last conditioned element on the line.

Since portions of the body of knowledge may be filtered out via the filter for each lens, it should be appreciated that each line displayed in a lens may represent a different quantity of information in the body of knowledge. Accordingly, it is desirable to maintain the shallow and deep bounds in terms of locations within the body of knowledge, and thus, independent of the particular information displayed in a lens.

Routine 150 begins in block 152 by calculating the number of lines for the lens based upon its current dimensions. The dimensions that may affect the number of lines displayed include the height and width of a lens, as well as an optional zoom factor for the lens that determines the size of the information that will be displayed therein. In addition, the number of lines for the lens may be dependent upon the font size for textual information displayed in any given focus effect (e.g., normal, highlighted, or obscured), or on the current resolution of the display. Calculation of the number of lines to display in a window, however, is a routine operation that is well known in the art.

Next, block 154 is executed to determine whether the lens is a depth vector lens. If it is, block 156 is executed to determine whether any lens in the current lens set is already open. If so, block 158 is executed to set the deep bound for the lens to initially be equal to a list of maximum line offsets for the conditioned elements in the top line of the primary lens in the current lens set. If not, block 160 is executed to set the deep bound for the lens to initially be equal to a value representing the top of the body of knowledge. Returning to block 154, if the lens is a supplementary lens, block 162 is executed to set the deep bound for the lens to initially be equal to a list of maximum line offsets for the conditioned elements in the top line of the supplemented lens therefor.

After execution of any of blocks 158, 160 or 162, a fill lens routine 170 is called to fill the lens with information, and a render stack event is issued in block 164 to refresh the display of the abstraction stack on the computer display (described in greater detail in the herein incorporated applications). Routine 150 is then complete.

Fill lens routine 170, which is illustrated in greater detail in FIG. 9, generally operates to push lines of information from the body of knowledge sequentially into the bottom of the lens until the lens is full of information. Routine 170 receives a deep bound that initially points to the start location for the lens in the body of knowledge. The initial value stored in the shallow bound is not important, as routine 170 updates this value prior to termination. As will become apparent below, the deep bound is automatically updated as information is pushed into the bottom of the lens such that, upon completion of routine 170, the deep bound points to the end location for the lens in the body of knowledge.

Routine 170 begins in block 172 by clearing the minimum and maximum line offsets for each line. Next, a scroll down routine 180 is called to push a line of information into the bottom of the lens, while calculating the line offsets for the line and inherently updating the deep bound accordingly. Next, block 174 determines whether the line offsets for the top line of the lens are set, indicating that the lens is full of information. If not, routine 180 is again called until the lens is full. Once the lens is full, block 176 is executed to update the shallow bound for the lens to include a list of the minimum offsets for the conditioned elements in the top line of the lens. Routine 170 is then complete.

Figure 10:
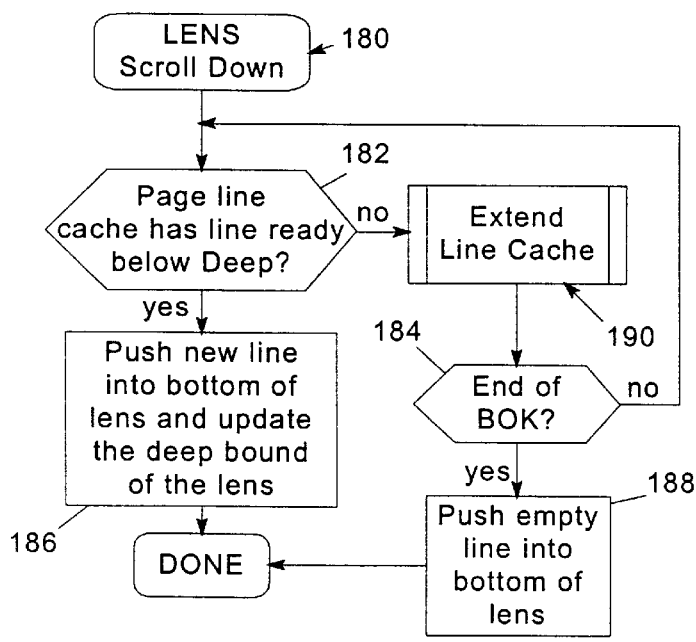
FIG. 10 is a flowchart illustrating the program flow of the scroll down routine of FIG. 9.

FIG. 10 illustrates scroll down routine 180 in greater detail. Routine 180 maintains a line cache of rendered cells for placement within a lens. The routine begins in block 182 by determining whether the line cache has a line ready to be pushed into the lens, indicated by the existence of a line of information below the deep bound for the lens. If not, extend line cache routine 190 is called to add information to the line cache. As long as the end of the body of knowledge is not detected as a result of this routine, block 184 then passes control back to block 182 to determine whether a line is ready to be pushed into the bottom of the lens. However, if the end of the body of knowledge is detected, block 188 is executed to push an empty line into the bottom of the lens. Returning to block 182, once a line is available in the line cache, control is passed to block 186 to push the line into the lens, in a manner generally known in the art, and to update the deep bound of the lens. Upon completion of either of blocks 186 or 188, routine 180 is complete.

Figure 4:
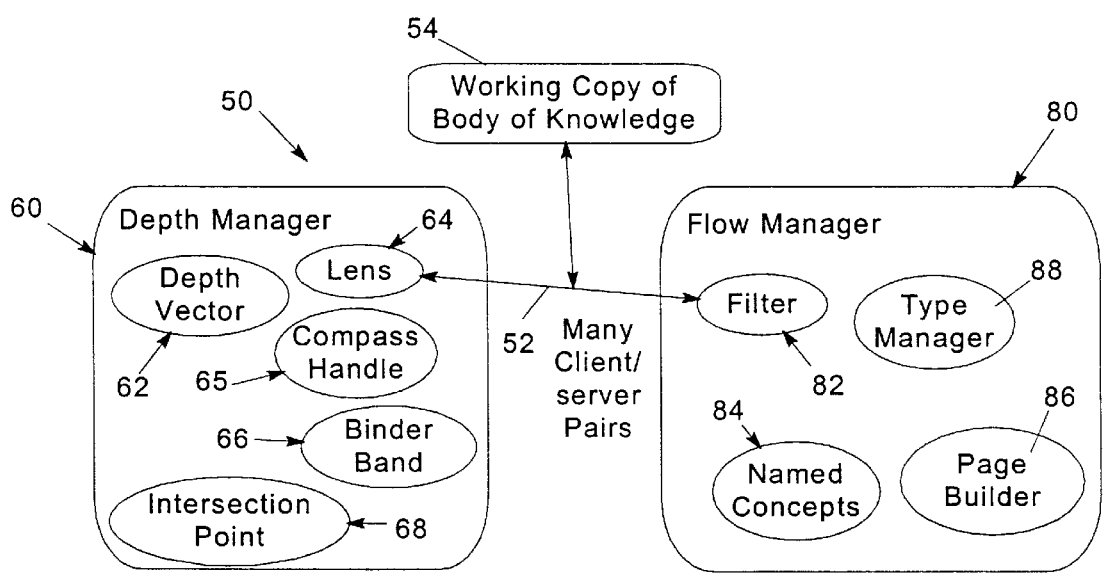
FIG. 4 is a block diagram of the software components in the abstraction stack of FIG. 2.
Figure 11:
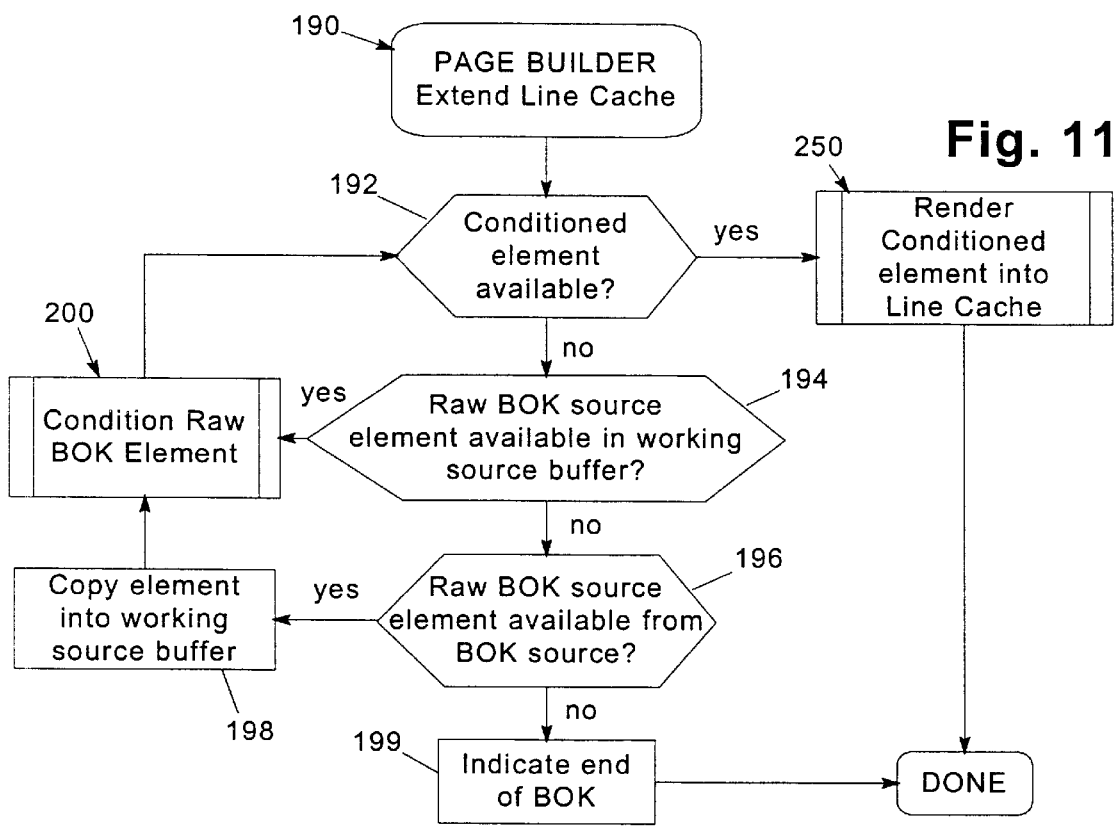
FIG. 11 is a flowchart illustrating the program flow of the extend line cache routine of FIG. 10.

Extend line cache routine 190 is illustrated in greater detail in FIG. 11. Routine 190 begins in block 192 by determining whether a conditioned element is available, typically indicated by its presence in a conditioned source cache for such elements (discussed below). If so, the element is rendered into the line cache by routine 250, and routine 190 terminates. If not, control passes to block 194 to determine whether a "raw", or unprocessed BOK source element is available in a working source buffer (e.g., within the working copy of the body of knowledge 54 for the lens, as shown in FIG. 4). If so, the raw element is conditioned into a conditioned element by routine 200, prior to returning control to block 192. If not, control passes to block 196 to determine whether a raw BOK source element is available from the BOK source—e.g., the master body of knowledge 40. If so, control passes to block 198 to copy such element into the working source buffer, prior to calling routine 200 to condition the element into a conditioned element. If not, however, the end of the body of knowledge has been detected, whereby control passes to block 199 to indicate such and terminate the routine.

Figure 12:
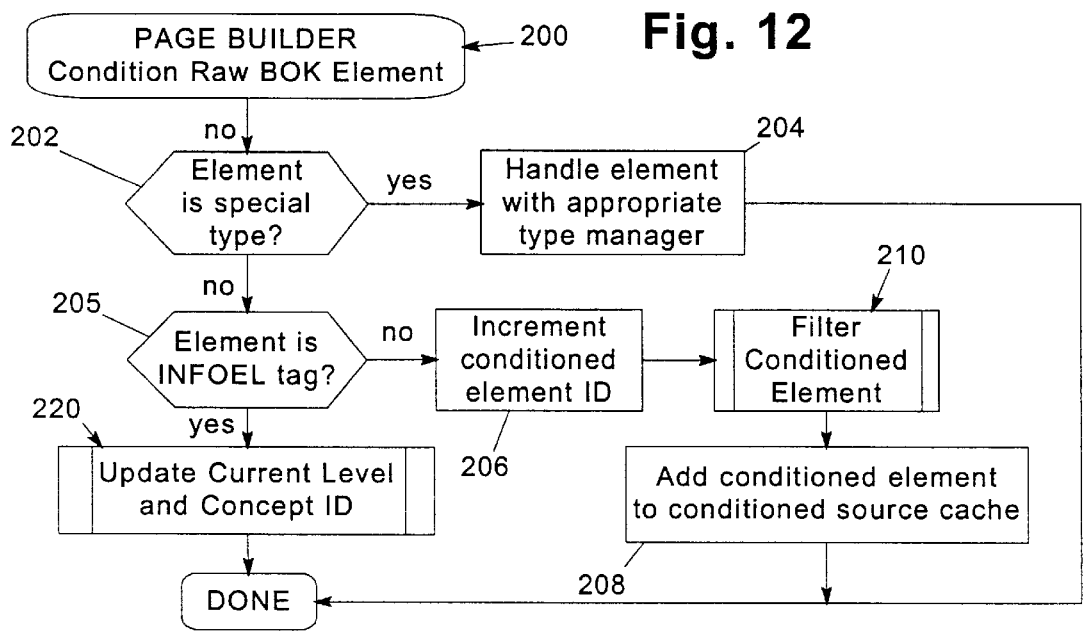
FIG. 12 is a flowchart illustrating the program flow of the condition raw BOK element routine of FIG. 11.

Routine 200 is illustrated in greater detail in FIG. 12. The routine begins in block 202 by determining whether the element is for a special type, e.g., a METHOD element (indicating that the element is associated with executable program code), or an OTHER element (indicating that the element is directed to a refreshable or internally filterable element), control passes to block 204 to handle such type with an appropriate type manager for the information. For example, the aforementioned application entitled "COMPUTER SYSTEM AND METHOD FOR CONTROLLING THE SAME UTILIZING A USER INTERFACE CONTROL INTEGRATED WITH MULTIPLE SETS OF INSTRUCTIONAL MATERIAL THEREFOR" describes in greater detail the special handling of METHOD elements by a method manager.

If the element is not a special type, control passes to block 205 to determine whether the element is an INFOEL tag— that is, whether the element includes an "<infoel>" or "</infoel>" tag. If not, control passes to block 206 to increment a conditioned element identifier variable for use in defining a new conditioned element. Next, a new conditioned element is created by a filter conditioned element routine 210, and the created conditioned element is added to the conditioned source cache in block 208. Returning to block 205, if the conditioned element is an INFOEL tag, the current level and concept identifiers are updated by routine 220. Upon completion of either block 208 or routine 220, routine 200 is then complete.

Figure 13:
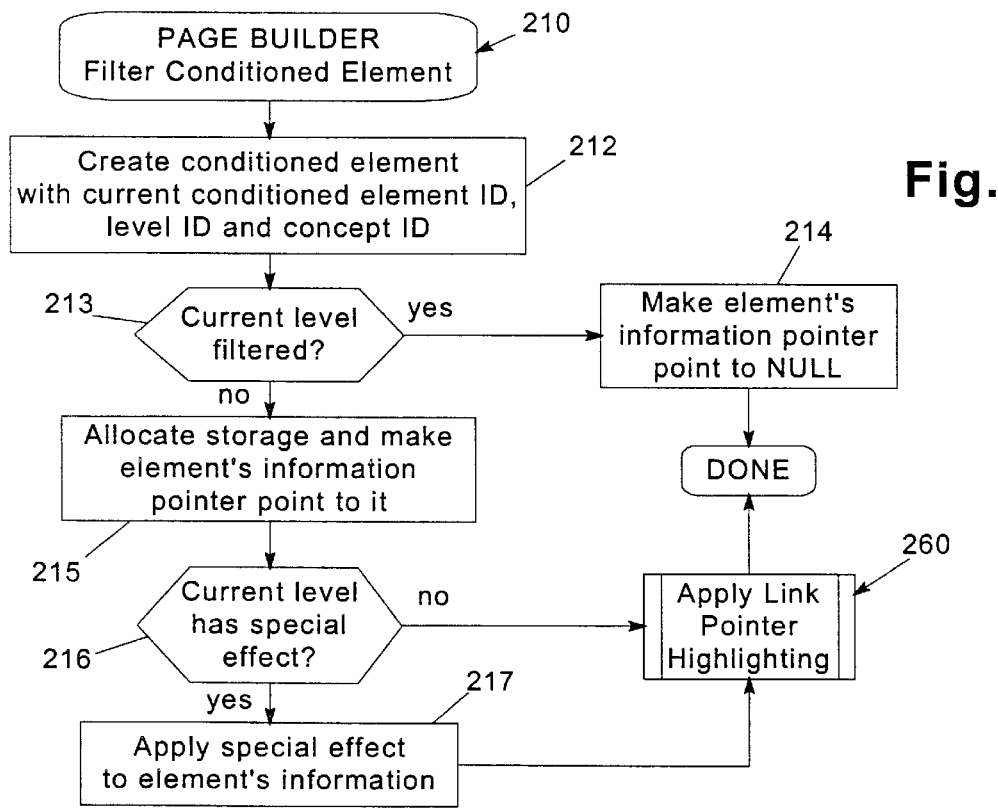
FIG. 13 is a flowchart illustrating the program flow of the filter conditioned element routine of FIG. 12.

Routine 210 is illustrated in greater detail in FIG. 13. Routine 210 begins in block 212 by creating a conditioned element using the current value of the conditioned element identifier (set above in block 206), as well as the current level and concept identifiers (discussed below). The conditioned element includes an information pointer that points to a block of storage representative of the conditioned source from a portion of the body of knowledge, or NULL if no such information is included in the element. Typically, the information included within a given conditioned element includes all information between any two "special" tags separately handled in routine 200—namely, the "<infoel>" and "</infoel>" tags, along with any tags for special types of information.

Next, block 213 determines whether the current level identifier is filtered by the current filter configuration for the lens. If so, control passes to block 214 to set the information pointer for the element to point to NULL, and routine 210 terminates. If not, control passes to block 215 to allocate storage for the conditioned element and point the information pointer for the conditioned element to point to the allocated storage. In addition, it is within this allocated storage that the information for the element is stored.

Next, block 216 is executed to determine whether the current level has a special (focus) effect associated therewith in the current filter configuration associated with the lens. If so, control is diverted to block 217 to apply the effect to the element's information. As discussed above, for example, different effects may be applied to information associated with the various levels in a lens so that different levels of abstraction may be distinguished in the lens.

Irrespective of whether a special effect is applied to the element, an apply link pointer highlighting routine 260 is called to determine whether a link pointer highlight should be applied to the element's information. Upon completion of routine 260, routine 210 is terminated.

Figure 14:
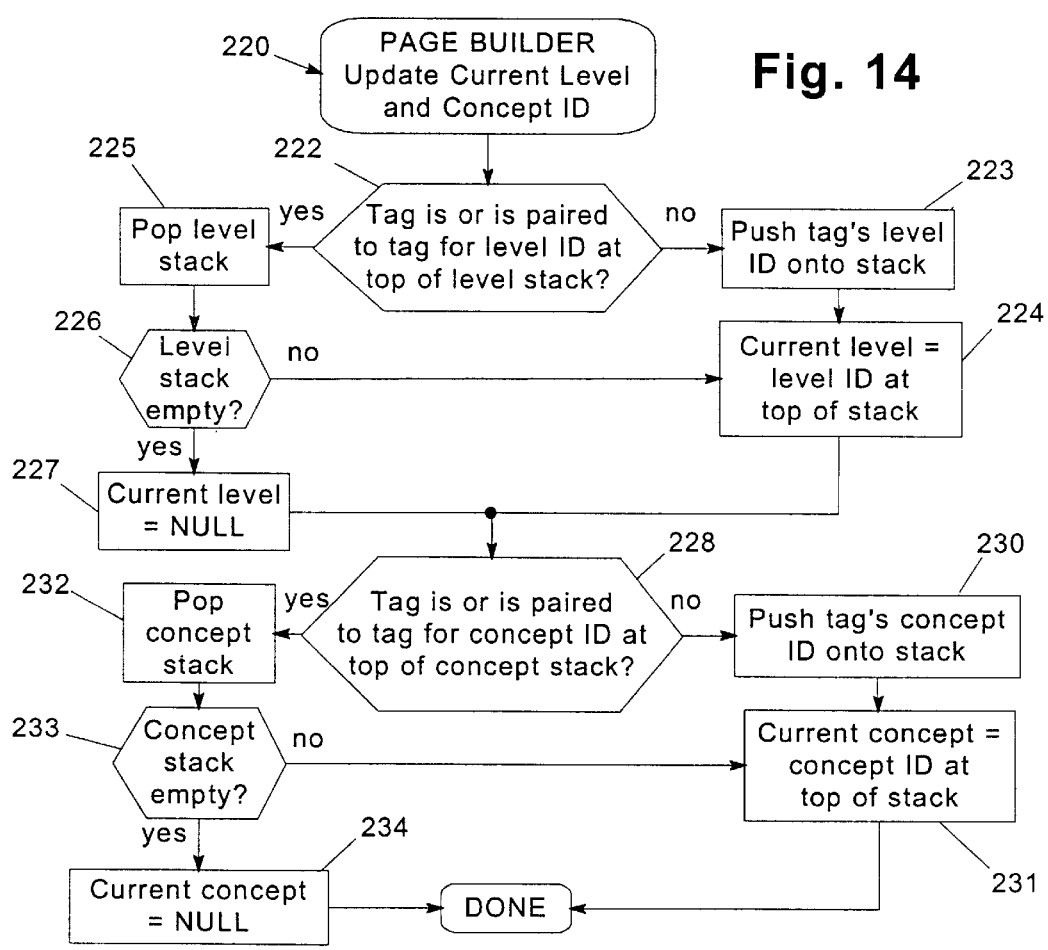
FIG. 14 is a flowchart illustrating the program flow of the update current level and concept ID routine of FIG. 12.

Routine 220 is discussed in greater detail in FIG. 14. Routine 220 is principally used to handle nested information elements by maintaining current level and concept identifiers representing the current level and named concept associated with a given location in the body of knowledge. Current level and concept identifiers are maintained in level and concept stacks, respectively. The current level and concept identifiers are respectively stored at the tops of the level and concept stacks, and as beginning and end tags of nested information elements are located, the stack is modified to track the level and concept identifiers of such tags.

Routine 220 begins in block 222 by determining whether the INFOEL tag being processed is or is paired to the tag for the level identifier found at the top of the level stack. If not, the tag's level identifier is pushed onto the level stack at block 223, and the current level is set to the level identifier at the top of the level stack in block 224 (that which was just pushed onto the stack), representing the beginning of a new level. If, however, the tag is for the level identifier at the top of the level stack, the level stack is popped in block 225 and the level retrieved thereby is discarded. Control is next passed to block 226 to determine whether the level stack is empty. If so, the current level is set to NULL in block 227. If not, control is passed to block 224 to set the current level to that stored at the top of the level stack.

Upon completion of either of blocks 224 or 227, control is passed to block 228 to perform a similar operation to determine the current concept identifier. Specifically, block 228 determines whether the INFOEL tag being processed is or is paired to the tag for the concept identifier at the top of the concept stack. If not, the tag's concept identifier is pushed onto the concept stack at block 230, and the current concept is set to the concept identifier at the top of the concept stack in block 231 (that which was just pushed onto the stack), representing the beginning of a new concept. If, however, the tag is for the concept identifier at the top of the concept stack, the concept stack is popped in block 232 and the concept retrieved thereby is discarded. Control is next passed to block 233 to determine whether the concept stack is empty. If so, the current concept is set to NULL in block 234. If not, control is passed to block 231 to set the current concept to that stored at the top of the concept stack. Upon completion of either of blocks 231 or 234, routine 220 is complete.

Figure 15:
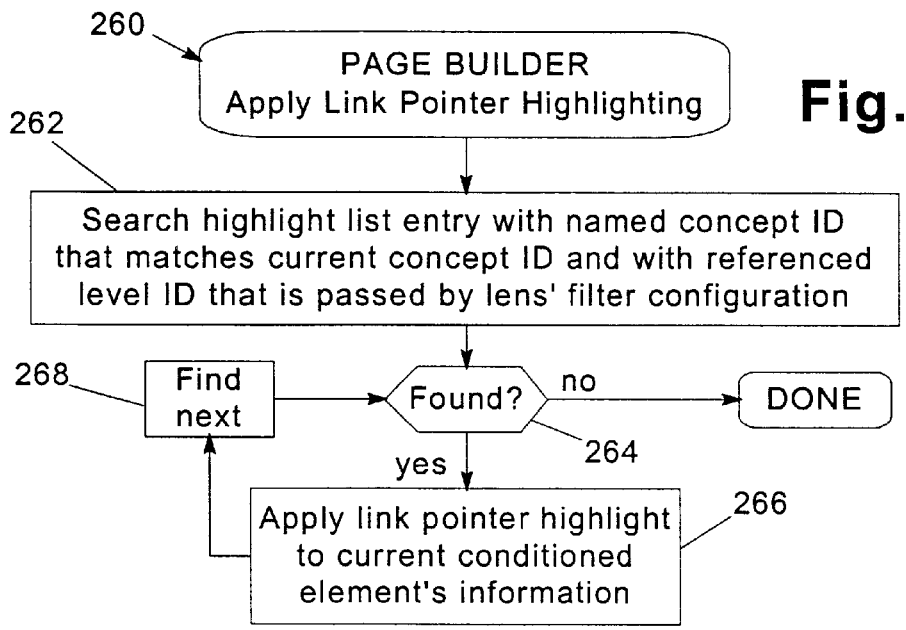
FIG. 15 is a flowchart illustrating the program flow of the apply link pointer highlighting routine of FIG. 13.

Apply link pointer highlighting routine 260 is illustrated in greater detail in FIG. 15. Routine 260 operates by locating each entry in a highlight list that has a named concept identifier that matches the current concept identifier and that has a reference level identifier that is passed by the lens' filter configuration, and applying link pointer highlighting to the conditioned element's information if any such entries exist. As will be discussed in greater detail below in connection with the handling of cross-over events, a highlight list is maintained in response to the pointer being disposed over a particular information element in the body of knowledge so that the named concepts that need to be highlighted when displaying a lens may be readily determined. Each entry in the list includes a named concept identifier that identifies the concept, and a referenced level identifier that restricts highlighting to lenses having filter configurations that pass the level(s) identified thereby.

Routine 260 begins in block 262 by searching the highlight list for an entry having a named concept identifier that matches the current concept identifier and with a reference level identifier that identifies a level that is passed by the lens' filter configuration. Control then passes to block 264 to determine whether such an entry was found. If so, control passes to block 266 to apply a suitable highlight to the current conditioned element's information. Control then passes to block 268 to attempt to find another entry in the highlight list, and then back to block 264. When no entries matching the search are found, routine 260 is complete.

The highlighting applied to a given information element may be the same irrespective of the logical type of the linkage. In the alternative, visually-distinct highlights may be applied in the alternative so that the link type, level, etc. of a particular linked concept ID may be distinguished on the computer display. As such, it should be appreciated that routine 260 may be configured to apply the link pointer highlight and terminate after a first entry in the highlight list is found.

The highlighting may also take any number of forms to visually distinguish highlighted information from unhighlighted information. For example, a display characteristic for highlighted information may be modified, e.g., by modifying font type, font size, font attributes, colors, patterns, shading, and/or blinking. Also, animation and audio/visual effects may be added to assist in distinguishing highlighted information if desired. Other manners of distinguishing highlighted information may be used in the alternative.

Figure 16:
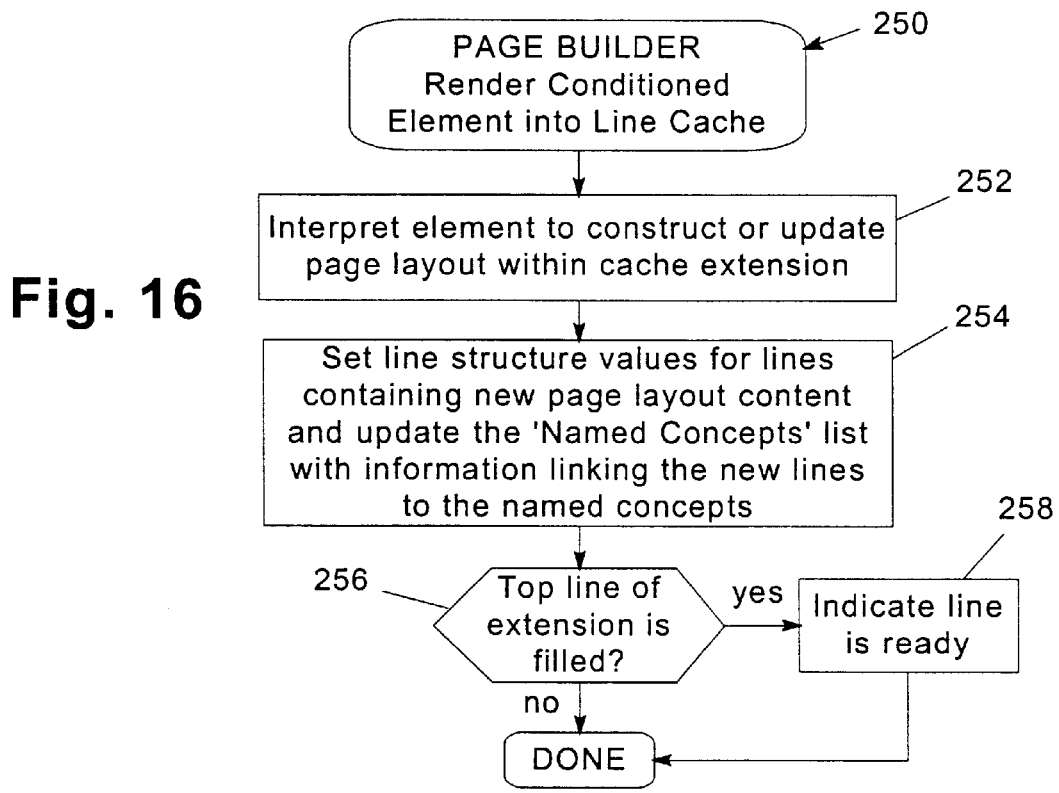
FIG. 16 is a flowchart illustrating the program flow of the render conditioned element into line cache routine of FIG. 11.

FIG. 16 illustrates render conditioned element into line cache routine 250 in greater detail. Routine 250 begins in block 252 by interpreting the conditioned element to construct or update a page layout within the line cache extension, a process that varies depending upon the type of information being rendered. It should be appreciated that the implementation of this block would be well within the ability of one of ordinary skill in the art, and moreover, that much of such implementation would operate in a manner similar to that for conventional HTML rendering provided by a page builder for a conventional browser. Next, in block 254, the line structure values are set for each line affected by the rendered element—specifically the array of cells, the beginning and ending cell indexes, the minimum and maximum cell offsets and concept identifier for each conditioned element. It should be appreciated, for example, that an image, among other information, may span several lines, and thus, multiple line structures may need to be updated to reflect the rendering of any particular conditioned element.

Next, in block 256, it is determined whether the top line of the extension is filled. If so, control is diverted to block 258 to indicate that the line is ready, prior to terminating routine 250. If not, routine 250 is simply terminated without such an indication.

As discussed above, an important aspect of the user interface utilized with abstraction stack 50 is that of linking together information elements using the named concepts discussed above. This is typically performed through the use of a link pointer, which typically is implemented using a specific link pointer mode for the pointer that is controlled via the mouse or other user interface device. Typically, but not necessarily, link pointer operation is limited to moving a pointer over an information element in the primary lens of a lens set.

In one implementation, cross-over events are generated in response to a user moving a pointer over a particular information element in the primary lens. The cross-over events are handled by the depth manager and placed into a queue under predetermined circumstances. An event manager in the queue issues highlight events to each lens in a lens set that is capable of displaying information elements associated with named concepts to highlight those information elements. In response, each lens processes the highlight event to update its display accordingly.

Figure 17:
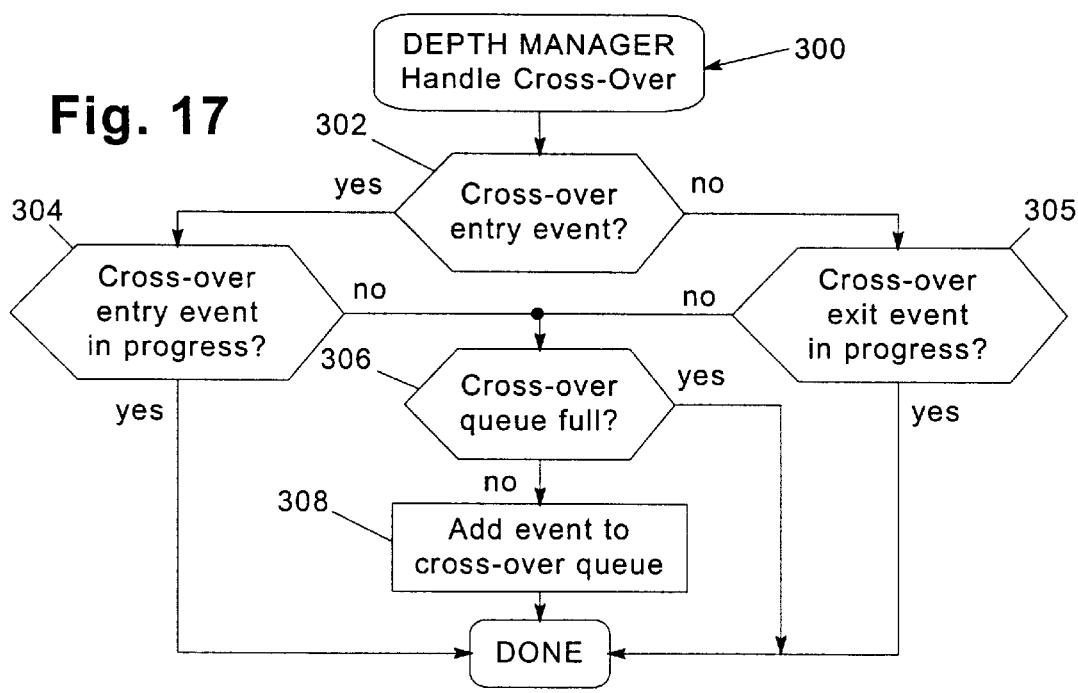
FIG. 17 is a flowchart illustrating the program flow of the handle cross-over routine of FIG. 6.

For example, a handle cross-over routine 300 that handles a cross-over event is illustrated in greater detail in FIG. 17. Routine 300 begins in block 302 by determining whether the cross-over event is an entry event (where the pointer has moved from a position outside of an information element to a position over the information element) or an exit event (where the pointer has moved off of an information element). If the event is an entry event, control passes to block 304 to determine whether a cross-over entry event is currently being processed. If it is, routine 300 terminates. If, however, no event is being processed, control passes to block 306 to determine whether a single entry cross-over queue is full—that is, whether a pending event is stored in the queue. If so, routine 300 terminates. If not, the event is added to the cross-over queue in block 308 prior to terminating routine 300.

Returning to block 302, if the event is an exit event, block 305 is executed to determine whether an exit event is currently being processed. If so, routine 300 terminates, and if not, control is passed to block 306 to add the event to the queue if the queue is empty.

Figure 18:
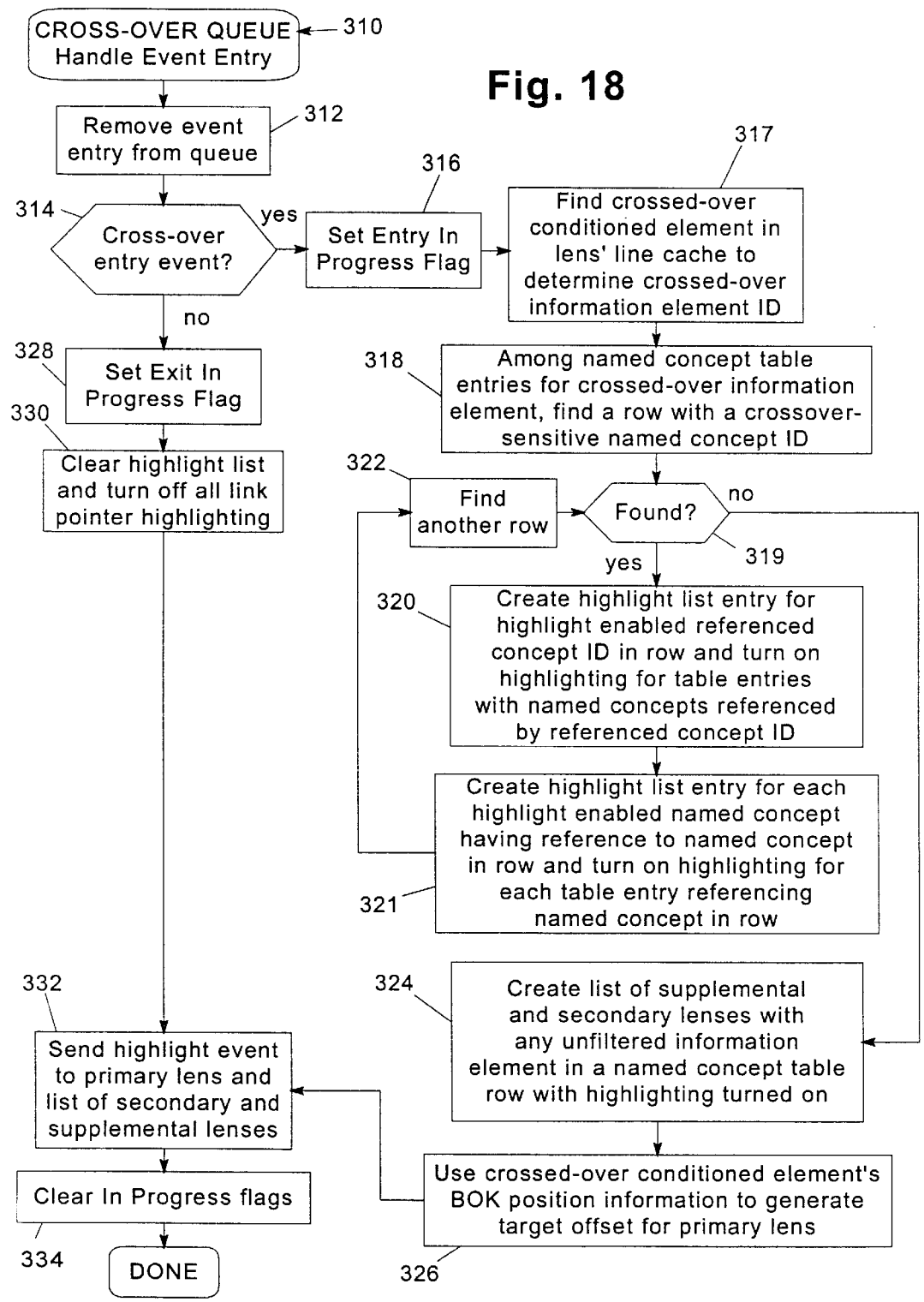
FIG. 18 is a flowchart illustrating the program flow of a handle event entry routine for a cross-over queue consistent with the invention.

The placement of an event on the cross-over queue generates an event entry event that is handled by a handle event entry routine 310 illustrated in FIG. 18. Routine 310 begins in block 312 by removing the event entry from the queue. Next, block 314 determines whether the event is a cross-over entry event. If so, block 316 is executed to set an Entry In Progress flag, indicating that an entry event is currently being processed. It is generally this flag that is tested in block 304 of FIG. 17.

Next, block 317 determines the information element identifier of the information element crossed-over by finding the crossed-over conditioned element in the line cache for the lens. Next, in block 318 a named concept table (e.g., having the format shown in Table II above) is accessed to find each entry (or row) for the crossed-over information element. Among these entries, block 318 attempts to locate a row in the table with a crossover-sensitive named concept identifier.

Control then passes to block 319 to determine whether such a row exists, and if so, passes control to blocks 320 and 321 to build a highlight list of named concepts that should be highlighted in response to the crossover event. As discussed above, the highlight list is used by apply link pointer highlighting routine 260 of FIG. 15 to determine which condition elements should be highlighted in a lens.

Block 320 generally adds highlight list entries for each highlight enabled named concept referenced by the named concept for the current information element. Specifically, if the found row's link type and referenced concept identifier are both highlight enabled by the current configuration settings, the found row's reference concept identifier and reference level identifier are used to create a highlight list entry. In addition, highlighting is turned on for each named concept table entry having a named concept identifier that matches the found row's reference concept identifier (e.g., by setting a flag for the entry in the column entitled "highlight on").

Block 321 generally adds highlight list entries for the opposite situation—that of references for which the named concept identifier for the crossed-over information element is a target. Thus, for each named concept table entry with a highlight enabled named concept identifier and link type, block 321 creates a highlight list entry using the table entry's named concept identifier and reference level identifier if the found row's named concept identifier matches the table entry's reference concept identifier. In addition, block 321 turns on highlighting for any such named concept table entry (e.g., by setting the appropriate flag in the table).

In the alternative, it may be desirable to limit references to unidirectional highlighting, whereby highlighting of information elements associated with named concepts that reference a named concept for a crossed-over information element is not performed. In such instances, block 321 may be omitted.

Upon completion of blocks 320 and 321, control passes to block 322 to attempt to find another row that matches the criteria set forth in block 318, and control passes to block 319. If no such rows are found, block 319 passes control to block 324 to create a list of supplemental and/or secondary lenses that have at least one unfiltered information element that is identified in the named concept table as having a row therefor with highlighting turned on. Either then entirety of the body of knowledge may be searched for such unfiltered information elements, or in the alternative, for supplementary lenses only the information elements in the line caches therefor may need to be analyzed since no coordinated scrolling of supplementary lenses will be required.

Next, block 326 generates a target offset in the body of knowledge to the information element in the primary lens using the position of the crossed-over conditioned element. Next, block 332 is executed to send a highlight event to the primary lens and the list of secondary and supplementary lenses such that each lens updates its display to highlight the information element therein corresponding to the enabled concept ID's. Next, block 334 clears the Entry In Progress and Exit In Progress flags, and routine 310 terminates.

Returning to block 314, if the entry in the queue is for an exit event, control passes to block 328 to set an Exit In Progress flag, indicating that an exit event is currently being processed. Block 330 is then executed to disable all link pointer highlighting, e.g., by clearing the highlight list and turning off all link pointer highlighting in the named concept table. Control then passes to blocks 332 and 334 prior to terminating the routine.

Figure 19:
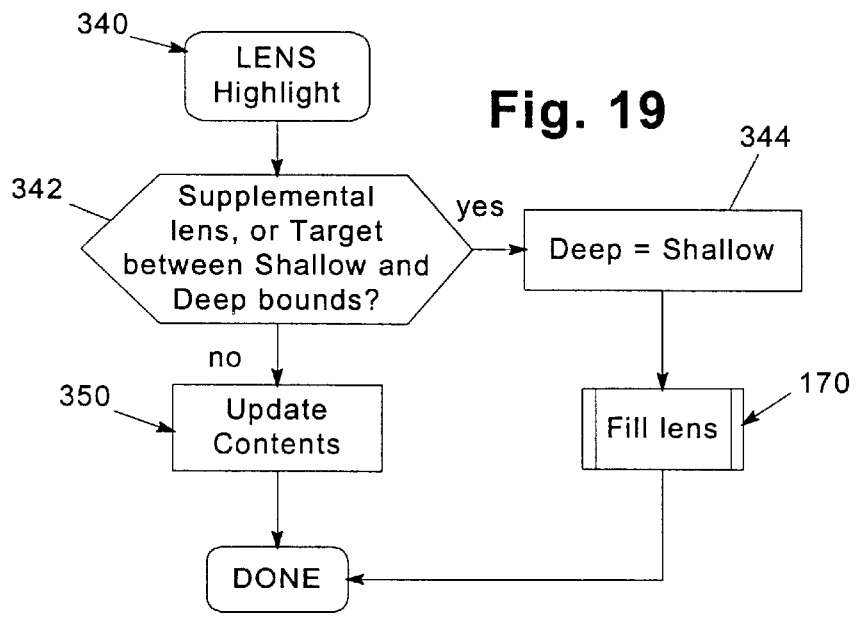
FIG. 19 is a flowchart illustrating the program flow of the highlight routine called by the handle event entry routine of FIG. 18.

A highlight event handling routine 340 is illustrated in greater detail in FIG. 19. Routine 340 begins in block 342 by determining whether the lens is a supplemental lens or (if not) the target location in the body of knowledge that is specified in the event is between the shallow and deep bounds for the lens. If so, no scrolling of the lens is required, so the deep bound for the lens is set to the value of the shallow bound in block 344, and fill lens routine 170 is called to refresh the contents of the lens, after which routine 340 is complete. By setting the deep bound to the shallow bound, the deep and shallow bounds for the lens will be the same after the highlight event as they were before the event was processed. However, after the fill routine, the highlight status of the information elements with enabled concept ID's will either be set or cleared based upon the flag set therefor in routine 310 discussed above with reference to FIG. 18 (as described specifically with reference to FIG. 15).

Returning to block 342, if the target is not between the shallow and deep bounds for the lens, an update contents block 350 is executed to scroll the lens as necessary to display the target location in the body of knowledge, in a manner which is discussed in more detail in the aforementioned incorporated applications. Concurrent with this scrolling, the contents of the lens are refreshed to reflect the highlighted status thereof, as discussed above. Routine 340 is then complete. It should be appreciated that, in the alternative, no coordinated scrolling may be performed in response to a cross-over event, and thus, it may not be necessary to separately call the update contents routine to update a lens to display information elements related to the concept ID's but not currently displayed in the lens.

Figure 20:
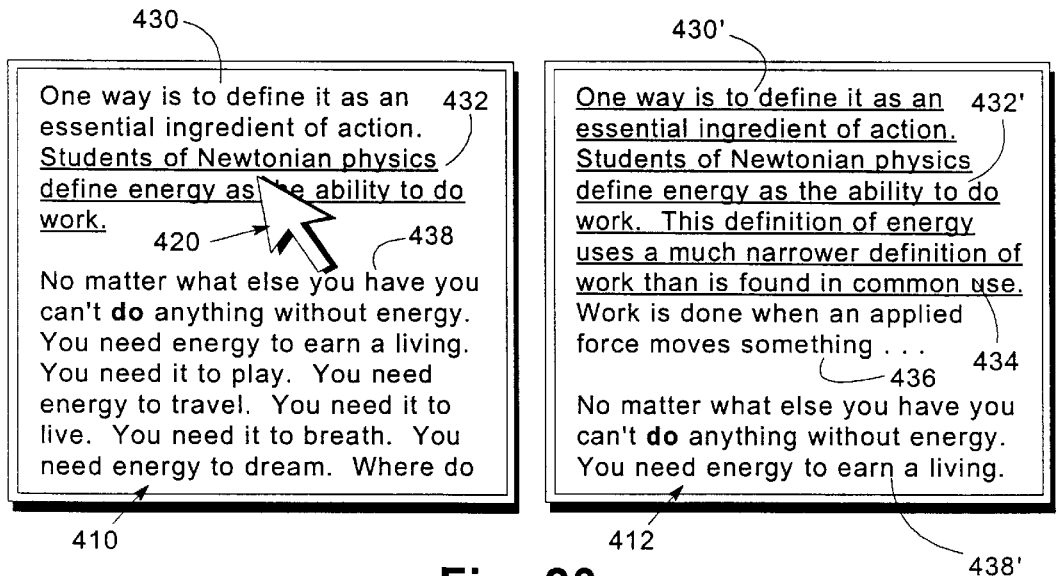
FIG. 20 is a block diagram of the lenses in the abstraction stack of FIG. 5, illustrating logically-typed concept linking consistent with the invention.

As an example of the operation of logically-typed linking consistent with the invention, FIG. 20 illustrates in a side-by-side fashion lenses 410 and 412 of abstraction stack 400 of FIG. 5, illustrating a portion of the body of knowledge defined in Table I.

As discussed above, lens 410 is configured to pass only the "null" and "gen" levels of abstraction. A set of display representations of several information elements in the example body of knowledge are displayed in lens 410 at 430, 432 and 438. Display representations 430, 432 and 438 respectively represent the information elements defined in lines 8, 9 and 13 of the example body of knowledge.

Lens 412 is configured to pass all levels of abstraction, and thus, a set of display representations 430', 432' and 438' of the information elements defined at lines 8, 9 and 13 in the example body of knowledge are displayed in lens 412. In addition, the information elements associated with the "phystd" level of abstraction, which are defined at lines 10 and 11 of the example body of knowledge but are blocked from lens 410, are displayed in lens 412 at 434 and 436.

For the purposes of illustration, it is assumed that the configuration settings implemented for the abstraction stack of FIG. 20 include the "newton_energy" concept ID being crossover sensitive, the "newton_energy" and "energy" concept ID's being highlight enabled, the "synonym" link type being highlight enabled, and highlight enablement for the "phystd" level links is restricted to the "phystd" level of abstraction.

With these configuration settings, it should be seen that, in response to a pointer 420 being disposed over representation 432, representations 432, 430', 432' and 434 are highlighted. For lens 410, only representation 432 is highlighted. Highlighting of representation 430 is blocked since lens 410 blocks information element associated with the "phystd" level of abstraction, and the reference level identifier for the information element for representation 432 (defined at line 9 of the example body of knowledge) is "phystd".

For lens 412, each of representations 430', 432' and 434 is highlighted in response to pointer 420 being disposed over representation 432. Representation 430' is highlighted since lens 412 passes the "phystd" level of abstraction (which is the reference level identifier for the reference defined at line 9 of the example body of knowledge). Representations 432' and 434 are highlighted based upon the matching "newton energy" named concept ID's therefor.

Figure 21:
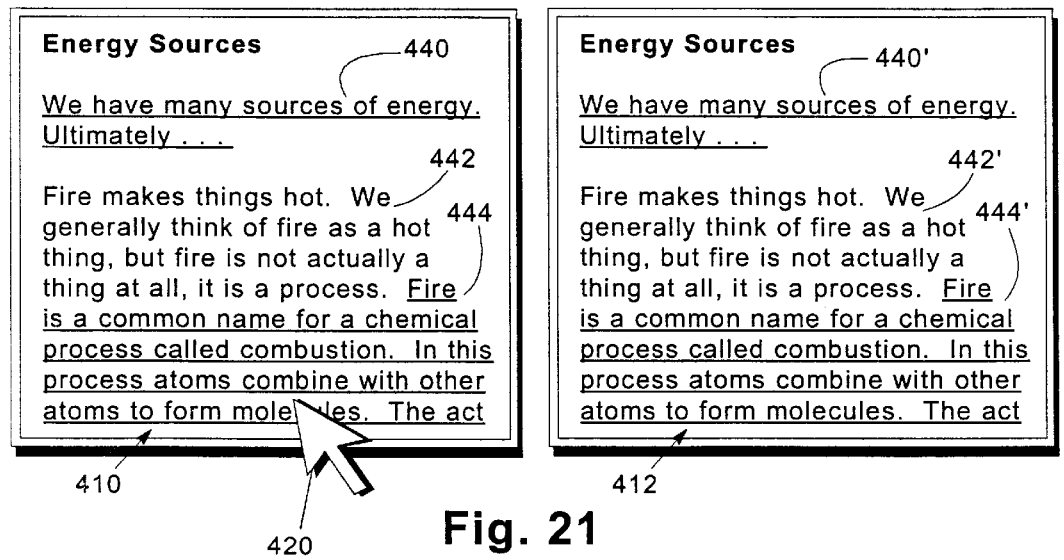
FIG. 21 is another block diagram of the lenses of FIG. 20.

FIG. 21 illustrates lenses 410, 412 displaying another portion of the example body of knowledge. Lens 410 displays representations 440, 442 and 444, which are respectively defined at lines 20, 21 and 22 of the example body of knowledge. Alternate representations of the information elements defining representations 440, 442 and 444 are displayed in lens 412 at 440', 442' and 444'. Assuming for this figure that the "energy_chemical" concept ID is crossover sensitive, the "energy_sources" and "energy_chemical" concept ID's are highlight enabled, the "member" and "synonym" link types are highlight enabled, and all levels of abstraction are highlight enabled, movement of pointer 420 over representation 444 results in highlighting of representations 440, 444, 440' and 444'.

Representations 440 and 440' are highlighted by virtue of the member-type reference defined at line 22 of the example body of knowledge. Representations 444 and 444' are highlighted by virtue of the matching concept ID's specified in line 22 of the example body of knowledge (i.e., the default synonym link).

It will therefore be appreciated that through the use of logically-typed links, a wide variety of link types may be defined and utilized by a user to enhance user comprehension of a body of knowledge. Various modifications may be made to the embodiments described herein without departing from the spirit and scope of the invention. Therefore, the invention lies in the claims hereinafter appended.

What is claimed is:

1. A method of presenting information from a body of knowledge to a user on a computer display, the body of knowledge stratified into a plurality of levels of abstraction and including a plurality of information elements associated with the plurality of levels of abstraction, the method comprising:

(a) displaying first and second display representations on a computer display, the first and second display representations respectively including information from first and second information elements, wherein the first and second information elements are respectively associated with first and second named concepts linked to one another via a concept link, the concept link being selectively enabled based upon a predetermined criteria; and (b) selectively highlighting the second display representation in response to user selection of the first display representation if the predetermined criteria for the concept link is met.

2. The method of claim 1, wherein user selection of the first display representation is directly responsive to placement of a user-actuated pointer over the first display representation.

3. The method of claim 1, further comprising displaying the first display representation in a first window on the computer display and displaying the second display representation in a second window on the computer display.

4. The method of claim 3, further comprising orienting the first and second windows along an abstraction axis defined in a three dimensional workspace.

5. The method of claim 3, further comprising displaying a connector element extending between the first and second windows.

6. The method of claim 1, wherein selectively highlighting the second display representation includes applying an effect to the second display representation by modifying a display characteristic thereof, the display characteristic selected from the group consisting of font type, font size, font attribute, color, pattern, shading, blinking, animation, audio effects, and combinations thereof.

7. The method of claim 1, wherein the predetermined criteria for the concept link includes the first named concept being crossover sensitive.

8. The method of claim 7, wherein the first named concept has associated therewith a user-configurable crossover sensitivity status.

9. The method of claim 1, wherein the predetermined criteria for the concept link includes the second named concept being highlight enabled.

10. The method of claim 9, wherein the second named concept has associated therewith a user-configurable highlight enabled status.

11. The method of claim 9, wherein the link type for the concept link is one of a plurality of link types, wherein each link type in the plurality of link types has associated therewith a user-configurable highlight enabled status.

12. The method of claim 11, wherein the plurality of link types are each selected from the group consisting of a synonym link type, an antonym link type, a member link type, a parent-child link type, an antecedent-consequent link type, a sibling link type, a cousin link type, a prerequisite-dependent link type, a biconditional connective link type, a codependent link type, a mutually exclusive link type, a superseding-superseded link type, a premise-condition link type, an inference link type, an example link type, a counterexample link type, an object-class link type, a logically equivalent link type, and combinations thereof.

13. The method of claim 1, wherein the predetermined criteria for the concept link includes a link type for the concept link being highlight enabled.

14. The method of claim 1, wherein the predetermined criteria for the concept link includes a selected level of abstraction identified by a level identifier for the concept link being highlight enabled.

15. The method of claim 14, wherein each of the plurality of levels of abstraction has associated therewith a user-configurable restricted level status.

16. The method of claim 1, wherein the concept link is defined in the first information element, the first information element including:
(a) a first concept identifier identifying the first named concept; and
(b) a reference associated with the first concept identifier, the reference including a second concept identifier that identifies the second named concept.

17. The method of claim 16, wherein the predetermined criteria for the concept link includes a match of the first and second concept identifiers.

18. The method of claim 16, wherein the reference includes a link type identifier.

19. The method of claim 18, wherein the reference farther includes a level identifier.

20. The method of claim 19, wherein the link type identifier identifies at least one of a plurality of link types, wherein the level identifier identifies at least one of the plurality of levels of abstraction, and wherein the method further comprises receiving user input from a dialog box presented to a user, the dialog box including a plurality of highlight enablement controls, each highlight enablement control associated with one of a named concept, link type, and level of abstraction, wherein each highlight enablement control defines a highlight enablement setting for the named concept, link type, or level of abstraction associated therewith, and wherein the predetermined criteria for the concept link includes a comparison of at least one of the named concepts identified by the second concept identifier, the link type identified by the link type identifier, and the level of abstraction identified by the level identifier, with the highlight enablement setting therefor.

21. The method of claim 20, wherein the dialog box further includes a plurality of crossover sensitivity controls, each associated with a named concept, wherein each crossover sensitivity control defines a crossover sensitivity setting for the named concept associated therewith, and wherein the predetermined criteria for the concept link includes a comparison of the named concept identified by the first concept identifier with the crossover sensitivity setting therefor.

22. The method of claim 1, wherein the concept link is defined in the second information element, the second information element including:
(a) a first concept identifier identifying the second named concept; and
(b) a reference associated with the first concept identifier, the reference including a second concept identifier that identifies the first named concept.

23. A computer system configured to present to a user information from a body of knowledge stratified into a plurality of levels of abstraction and including a plurality of information elements associated with the plurality of levels of abstraction, the computer system comprising:
(a) a computer display; and
(b) a processor, the processor configured to display first and second display representations on the computer display, the first and second display representations respectively including information from first and second information elements from the plurality of information elements, and the first and second information elements respectively associated with first and second named concepts linked to one another via a concept link, the concept link being selectively enabled based upon a predetermined criteria, wherein the processor is further configured to selectively highlight the second display representation in response to user selection of the first display representation if the predetermined criteria for the concept link is met.

24. A program product, comprising:
(a) a program configured to perform a method of presenting information from a body of knowledge to a user on a computer display, the body of knowledge stratified into a plurality of levels of abstraction and including a plurality of information elements associated with the plurality of levels of abstraction, the method comprising:
(1) displaying first and second display representations on a computer display, the first and second display representations respectively including information from first and second information elements, wherein the first and second information elements are respectively associated with first and second named concepts linked to one another via a concept link, the concept link being selectively enabled based upon a predetermined criteria; and
(2) selectively highlighting the second display representation in response to user selection of the first display representation if the predetermined criteria for the concept link is met; and
(b) a signal bearing media bearing the program.

25. The program product of claim 24, wherein the signal bearing media is transmission type media.

26. The program product of claim 24, wherein the signal bearing media is recordable media.

* * * * *